United States Patent
Yang et al.

(10) Patent No.: US 9,509,426 B2
(45) Date of Patent: Nov. 29, 2016

(54) INTERFERENCE ESTIMATION RESOURCE DEFINITION AND USAGE FOR ENHANCED RECEIVERS

(71) Applicant: Nokia Solutions and Networks Oy, Espoo (FI)

(72) Inventors: Weidong Yang, Hoffman Estates, IL (US); Xiaoyi Wang, Wheeling, IL (US); Klaus Hugl, Vienna (AT); Rapeepat Ratasuk, Hoffman Estates, IL (US); Jun Tan, Lake Zurich, IL (US); Timo Erkki Lunttila, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 115 days.

(21) Appl. No.: 14/508,401

(22) Filed: Oct. 7, 2014

(65) Prior Publication Data
US 2015/0098440 A1    Apr. 9, 2015

Related U.S. Application Data

(60) Provisional application No. 61/887,655, filed on Oct. 7, 2013.

(51) Int. Cl.
*H04J 11/00* (2006.01)
*H04L 5/00* (2006.01)
*H04W 72/08* (2009.01)

(52) U.S. Cl.
CPC ............ *H04J 11/0056* (2013.01); *H04L 5/005* (2013.01); *H04L 5/0007* (2013.01); *H04L 5/0051* (2013.01); *H04L 5/0053* (2013.01); *H04L 5/0073* (2013.01); *H04W 72/082* (2013.01)

(58) Field of Classification Search
CPC  H04J 11/0056; H04L 5/0007; H04L 5/0073; H04L 5/0051; H04L 5/0053; H04L 5/005; H04W 72/082
See application file for complete search history.

(56) References Cited

U.S. PATENT DOCUMENTS

| | | | |
|---|---|---|---|
| 2012/0069940 A1* | 3/2012 | Guo | H04B 1/711 375/346 |
| 2013/0089040 A1 | 4/2013 | Tabet et al. | |
| 2014/0036706 A1 | 2/2014 | Mondal et al. | 370/252 |
| 2014/0233466 A1* | 8/2014 | Pourahmadi | H04L 5/0051 370/329 |

OTHER PUBLICATIONS

"Sample matrix inversion", http://en.wikipedia.org/wiki/Sample_matrix_inversion; Sep. 26, 2013, 1 page.

(Continued)

*Primary Examiner* — Jianye Wu
(74) *Attorney, Agent, or Firm* — Harrington & Smith

(57) ABSTRACT

At a wireless node in a wireless network, multiple interference estimation resources are received in a time-frequency resource space. The multiple interference estimation resources are resource elements in an assigned physical shared channel of the time-frequency resource space that do not contain physical shared channel data for the wireless node. An interference covariance matrix is determined from received signals on the multiple interference estimation resources. Symbol estimates are determined for a desired signal based in part by using the interference covariance matrix. Methods, computer programs and products and apparatus are disclosed. The techniques may be used for uplink, downlink, or D2D communications.

21 Claims, 12 Drawing Sheets

(56) References Cited

OTHER PUBLICATIONS

"Study on Network-Assisted Interference Cancellation and Suppression for LTE", Media Tek, Renesas Mobile Europe, Broadcom Corporation, 3GPP TSG RAN Meeting #59, RP130404, Vienna, Austria, Feb. 26-Mar. 1, 2013, 7 pgs.

"MMSE-Prewhitened-MLD Equalizer for MIMO DFT-Precoded-OFDMA", Kiran Kuehl, IEEE Wireless Communications Letters, vol. 1, No. 4, Aug. 2012, pp. 328-331.

"$3^{rd}$ Generation Partnership Project; Technical Specification Group Radio Access Network"; Evolved Universal Terrestrial Radio Access (E-UTRA); Physical layer procedures (Release 11), 3GPP TS 36.213 V11.4.0, Section 5.2, Sep. 2013, 5 pgs.

"$3^{rd}$ Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.5.0, pp. 205-206, Sep. 2013.

3GPP TS 36.212 V11.3.0 (Jun. 2013) "3rd Generation Partnership Project; Technical Specification Group Radio Access Network; Evolved Universal Terrestrial Radio Access (E-UTRA); Multiplexing and channel coding (Release 11)"; pp. 1-84; 3rd Generation Partnership Project (3GPP); Mobile Competence Centre; 650, Route des Lucioles; F-06921 Sophia-Antipolis Cedex; France.

\* cited by examiner

Table 1

| Value | One Codeword:<br>Codeword 0 enabled,<br>Codeword 1 disabled<br>Message | Value | Two Codewords:<br>Codeword 0 enabled,<br>Codeword 1 enabled<br>Message |
|---|---|---|---|
| 0 | 1 layer, port 7, $n_{SCID}=0$ | 0 | 2 layers, ports 7-8, $n_{SCID}=0$ |
| 1 | 1 layer, port 7, $n_{SCID}=1$ | 1 | 2 layers, ports 7-8, $n_{SCID}=1$ |
| 2 | 1 layer, port 8, $n_{SCID}=0$ | 2 | 3 layers, ports 7-9 |
| 3 | 1 layer, port 8, $n_{SCID}=1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

FIG. 3A

Table 2

| | One Codeword:<br>Codeword 0 enabled,<br>Codeword 1 disabled | | | Two Codeword2:<br>Codeword 0 enabled,<br>Codeword 1 enabled | |
|---|---|---|---|---|---|
| Value | Message | IER | Value | Message | IER |
| 0 | 1 layer, port 7, $n_{SCID}=0$ | IER | 0 | 2 layers, ports 7-8, $n_{SCID}=0$ | IER |
| 1 | 1 layer, port 7, $n_{SCID}=1$ | IER 1 | 1 | 2 layers, ports 7-8, $n_{SCID}=1$ | IER 1 |
| 2 | 1 layer, port 8, $n_{SCID}=0$ | IER 2 | 2 | 3 layers, ports 7-9 | IER 2 |
| 3 | 1 layer, port 8, $n_{SCID}=1$ | IER 3 | 3 | 4 layers, ports 7-10 | IER 1 |
| 4 | 2 layers, ports 7-8 | IER 4 | 4 | 5 layers, ports 7-11 | IER 1 |
| 5 | 3 layers, ports 7-9 | IER 1 | 5 | 6 layers, ports 7-12 | IER 1 |
| 6 | 4 layers, ports 7-10 | IER 1 | 6 | 7 layers, ports 7-13 | IER 1 |
| 7 | Reserved | | 7 | 8 layers, ports 7-14 | IER 1 |

FIG. 3B

Table 3

| Value | One Codeword: Codeword 0 enabled, Codeword 1 disabled | | Two Codeword2: Codeword 0 enabled, Codeword 1 enabled | | |
|---|---|---|---|---|---|
| | Message | IER | Value | Message | IER |
| 0 | 1 layer, port 7, $n_{SCID}=0$ | | 0 | 2 layers, ports 7-8, $n_{SCID}=0$ | IER 1 and IER 3 |
| 1 | 1 layer, port 7, $n_{SCID}=1$ | IER 1 | 1 | 2 layers, ports 7-8, $n_{SCID}=1$ | IER 2 and IER 4 |
| 2 | 1 layer, port 8, $n_{SCID}=0$ | IER 2 | 2 | 3 layers, ports 7-9 | IER 1 |
| 3 | 1 layer, port 8, $n_{SCID}=1$ | IER 3 | 3 | 4 layers, ports 7-10 | IER 1 |
| 4 | 2 layers, ports 7-8 | IER 4 | 4 | 5 layers, ports 7-11 | IER 1 |
| 5 | 3 layers, ports 7-9 | IER 1 | 5 | 6 layers, ports 7-12 | IER 1 |
| 6 | 4 layers, ports 7-10 | IER 1 | 6 | 7 layers, ports 7-13 | IER 1 |
| 7 | Reserved | | 7 | 8 layers, ports 7-14 | IER 1 |

FIG. 4

1.1 UE reports its receiver capability (E-LMMSE-IRC or L-CWIC, R-ML).
1.2 UE feeds back RSRP/RSRQ measurements to the eNB.
1.3 UE can feed back CSI reports with multiple CSI processes which are configured for serving and interfering cells.

↓

2.1 The eNB configures a UE with one or more interference estimation resources (IER).
2.1.1 A power scaling ratio can be signaled with each configured IER; if not signaled the power scaling ratio is 1.
2.1.2 The eNB configures a UE with one or more Reference Signal resources (RSR) associated with the desired UE's and/or co-scheduled UE's transmission(s).

↓

3.1 The eNB transmits to the UE with chosen MCS level, transmission rank, precoding matrix for the scheduled UE.

3.2 From UE's receiver capability and assessment on UE's chance to benefit from interference suppression and interference cancellation, the eNB signals one or more IER and zero or more RSR to the UE. The eNB can signal to the UE with zero or more demodulation reference signals of co-scheduled UE(s) and the number of ports for each demodulation reference signal.
3.2.1 A power scaling ratio can be signaled with each configured co-scheduled UE's demodulation signal; if not signaled, the power scaling ratio is 1.
3.2.2 The modulation order(s) of the co-scheduled UE(s) can be signaled to the UE with R-ML capability.
3.2.3 PRB allocation, MCS level, HARQ version, and scrambling seed for the co-scheduled UE(s) can be signaled to the UE with L-CWIC capability and which can benefit from interference cancellation according to the eNB.

↓

4.1 An interference covariance matrix is estimated from a signaled IER.
4.2 Demodulation reference signal(s) and RSRs if available are used to obtain channel estimates for the desired signal and interference.
4.3 The contribution from interference is found from the channel estimate for interference and the calculated interference covariance matrix is weighed with power scaling ratios to obtain a weighted interference covariance matrix.
4.4 A receive weight is found from the weighted interference covariance matrix and channel estimate for the desired signal.

FIG. 7

INTERFERENCE ESTIMATION RESOURCE DEFINITION AND USAGE FOR ENHANCED RECEIVERS

CROSS-REFERENCE TO RELATED APPLICATIONS

The present application claims the benefit under 35 U.S.C. §119(e) of U.S. Provisional Patent Application No. 61/887,655, filed on Oct. 7, 2013, the disclosure of which is hereby incorporated by reference in its entirety.

TECHNICAL FIELD

This invention relates generally to wireless networks and, more specifically, relates to interference estimation.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined at the end of this document prior to the claims.

In terms of network assisted interference cancelation and suppression (NAICS), several different advanced receiver structures may be envisioned. These different receiver classes included receivers based on interference rejection combining (IRC receivers), receivers performing interference cancelation (IC receivers) as well as receivers decoding using the maximum likelihood principles (ML receivers). IRC receivers might include classical linear MMSE-IRC receivers as well as enhanced versions based on the same MMSE-IRC principles. The class of interference cancelation (IC) type or receivers includes, beside others, symbol level IC receivers (SLIC) as well as codeword type of IC receivers (CWIC) where the cancelation can be done using linear cancelation techniques (L-CWIC) or alternatively using ML principles in the interference cancelation stage (ML-CWIC). The interference cancelation in general can be performed through serial interference cancelation (SIC), parallel interference cancellation (PIC) as well as using iterative methods (Iterative IC). Finally, the class of ML type of joint receivers may include, besides its basic operation, some reduced complexity implementations (R-ML), iterative ML decoding (Iterative-ML) as well as a combination of iterative processing including some reduced complexity search functions (Iterative-R-ML).

It is noted that while interference suppression/rejection type receivers can be used alone in the NAICS operation, they can be also used as a component receiver for more complicated receivers in NAICS. For example, L-CWIC can use an interference suppression type receiver such as E-LMMSE-IRC to first demodulate a dominant interference signal before any type of IC operation, and then subtract the regenerated dominant interference signal from the received signal, the resulted signal is again passed to an interference suppression type receiver such as E-LMMSE-IRC to demodulate the desired signal and interference in this case constitutes of interference other than the dominant interference and the residue of cancelled dominant interference. Hence techniques which enhance the performance of interference suppression type receivers can also enhance the performance of some interference cancellation type receivers.

In general, the receiver model can be formulated as follows:

$$r_{t,f} = h_{t,f,1} x_1 + h_{t,f,2} x_2 + \ldots + h_{t,f,M} x_M + n.$$

Where $h_{t,f,1}$ is channel response for the desired signal, $x_1$ is the PDSCH for the victim UE (the UE of interest); $h_{t,f,2}, \ldots, h_{t,f,M}$ are the channel responses for interference, n is the thermal noise, t is the OFDM symbol index, f is the tone index; and $r_{t,f}$ is the received signal at the victim UE. Here "channel response" is understood to be the composition of the air channel and precoding matrix applied to the PDSCH transmission, and a "tone index" is an index for subchannels.

Let us first consider linear, interference suppression/rejection type of receivers. From estimation theory, the MMSE estimator for the linear receiver weight of an OFDM signal is given by the following:

$$W_{t,f,1} = \hat{R}_{t,f,in}^{-1} \hat{h}_{t,f,1}^H,$$

where $A^H$ is the Hermitian of A, $\hat{R}_{in}$ is the sample covariance matrix for interference and noise, and $\hat{h}_{t,f,1}$ is the channel estimate at (t, f) for the desired signal $x_1$. And the estimate of $x_1$ is given by $$\hat{x}_1 = W_{t,f,1} r_{t,f}.$$

Based on the above formula, the key factor impacting the performance of receiver-based linear interference rejection/suppression is to have interference estimation. The same thing holds for the other receiver types including ML and IC type of receivers. The better the estimate of the interference can be performed, the better the final decoding performance of the desired signal in the end will be. There are several ways to perform the interference estimation itself as well as channel estimation for the interfering transmitted signals. Below we consider different example approaches on how to derive the spatial covariance matrix of the interference to be used by linear MMSE-IRC type of receivers.

In a first approach (Approach 1), the following are performed:
First estimate the channel response for the desired signal from DMRS REs; and
Compute the total received signal covariance matrix and take out the channel estimation results from desired signals to determine $R_{t,f,in}$.

A second approach (Approach 2) involves estimating the top m channel responses in terms of receiver power from DMRS REs, $h_{t,f,1}, h_{t,f,m}$, as follows:

$$R_{t,f,in} = \sum_{k=2}^{m} h_{t,f,k} h_{t,f,k}^H + \sigma_n I.$$

The channel estimates themselves derived in this second approach can be used also in ML and IC type of receiver operation directly.

A third approach (Approach 3) is through the well-known "sample matrix inversion" principle from the PDSCH REs as such. The sample matrix inversion is an algorithm that estimates weights of an array (adaptive filter) by replacing the correlation matrix R, with its estimate. Using K samples x(k), k=1, 2, ..., K, an unbiased estimate of $R_U$, the correlation matrix of the array signals, may be obtained by means of a simple averaging scheme:

$$\hat{R}_U(k) = 1/k \sum (x(k)x^H(k)).$$

The expression of the theoretically optimal weights requires the inverse of $R_U$, and the inverse of the estimates matrix is then used for finding estimated optimal weights.

Therefore, the spatial correlation estimate will be given by using the n PDSCH RE samples available for a certain time/frequency point:

$$\hat{R}_{t,f,in} = \sum_{n=1}^{N} r_{t,f}[n] r_{t,f}^H[n].$$

There are challenges for all three approaches. For instance, looking at Approaches 1 and 2, as despreading with [+1+1] or [+1−1] is used in the channel estimation of $h_{t,f,n_1}$, and another DMRS (with channel response $h_{t,f,n_2}$) is also spread with the same pattern, then suppression of the contribution from $h_{t,f,n_2}$ in the estimate of $h_{t,f,n_1}$ is not really achieved.

With the second approach, joint estimation of $h_{t,f,1}, \ldots, h_{t,f,m}$ may be necessary in the case some of these components have similar power level to achieve good channel estimation quality of the different interference sources. Well performed successive channel estimation depends on good estimates of the power profile of $h_{t,f,1}, \ldots, h_{t,f,m}$. It can be envisioned that a UE can be assisted by the network with the following information the DMRS seeds; and The number of DMRS ports with each seed.

Besides, for the cases that interference reception power is much lower than the power of the UE's own signals, it is very difficult for the UE to derive a channel estimate/covariance matrix estimate of a particular interference source. As mentioned above, the channel estimates derived this way may not only be used by linear interference rejection/suppression type of receiver combining pre-filters, but may be used as well for interference cancelation and ML type of receiver processing.

With the third approach, there is actually no real issue in terms of having any DMRS or sequence limitations, but the MMSE performance relies on good channel estimation quality as such, as in the inversion of the MMSE—the same channel is present in the nominator and denominator. Therefore, channel estimation errors have a rather tremendous effect on performance deterioration of the IRC type of receiver.

It is also noted for maximum likelihood type receivers, typically a pre-whitening step is taken on the received signal, so contribution to the processed received signal from signals other than the desired signal and dominant interference signals is spatially white, which facilitates the application of advanced techniques in estimation theory or detection theory, as many of these techniques assume spatially white noise. For a pre-whitening step, see, e.g., MMSE-Prewhitened-MLD Equalizer for MIMO DFT-Precoded-OFDMA" by Kiran Kuchi, pp.328-331, IEEE Wireless Communications Letters, VOL. 1, NO. 4, August 2012. It is seen that the interference estimation, especially the interference covariance matrix estimation, is also important for maximum likelihood type receivers.

Now the importance of interference estimation is demonstrated for all the receiver types considered for NAICS (interference rejection, interference cancellation, maximum likelihood), and in the following the interference rejection (or interference suppression) type receiver and L-WCIC are used as illustrative examples.

In Rel-11, IMR (Interference Measurement Resource) is defined to facilitate the interference measurement for channel quality indication (CQI) calculation to support coordinated multi-point transmission (CoMP). Therefore, IMR REs could be used for interference covariance matrix estimation. However this option has some drawbacks:

1) The IMR duty cycle is at least 5 ms, which is not helpful for interference covariance matrix estimation since interference changes quickly from one 1 ms subframe to the next. Therefore, an estimate obtained in a certain subframe might not be valid as such even for the following downlink subframe. Therefore, such resources would need to be present in each subframe in order to help the receiver decoding operation.

2) Each IMR is of 4 REs in a physical resource block (PRB), but interference covariance matrix estimation may require a larger number of samples/REs in order to achieve a good estimation and as a consequence decoding performance.

3) Each IMR is of uniform density in all PRBs and the IMR pattern is the same across PRBs;

4) Each IMR RE is free of PDSCH transmissions from a single cell (including all potential spatial layers) in that PRB.

Thus, it can be seen that improvements could be made in this area.

BRIEF SUMMARY

This section is meant to be exemplary and is not meant to be limiting.

An exemplary embodiment is a method comprising: receiving, at a wireless node in a wireless network, a plurality of interference estimation resources in a time-frequency resource space, where the plurality of interference estimation resources are resource elements in an assigned physical shared channel of the time-frequency resource space that do not contain physical shared channel data for the wireless node; determining an interference covariance matrix from received signals on the plurality of interference estimation resources; and determining symbol estimates for a desired signal based in part by using the interference covariance matrix.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: receiving, at a wireless node in a wireless network, a plurality of interference estimation resources in a time-frequency resource space, where the plurality of interference estimation resources are resource elements in an assigned physical shared channel of the time-frequency resource space that do not contain physical shared channel data for the wireless node; determining an interference covariance matrix from received signals on the plurality of interference estimation resources; and determining symbol estimates for a desired signal based in part by using the interference covariance matrix.

Another exemplary embodiment is an apparatus comprising: means for receiving, at a wireless node in a wireless network, a plurality of interference estimation resources in a time-frequency resource space, where the plurality of interference estimation resources are resource elements in an assigned physical shared channel of the time-frequency resource space that do not contain physical shared channel data for the wireless node; means for determining an interference covariance matrix from received signals on the plurality of interference estimation resources; and means for determining symbol estimates for a desired signal based in part by using the interference covariance matrix.

An exemplary computer program product includes a computer-readable storage medium bearing computer program code embodied therein for use with a computer. The computer program code includes: code for receiving, at a wireless node in a wireless network, a plurality of interference estimation resources in a time-frequency resource space, where the plurality of interference estimation resources are resource elements in an assigned physical shared channel of the time-frequency resource space that do not contain physical shared channel data for the wireless node; code for determining an interference covariance matrix from received signals on the plurality of interference estimation resources; and code for determining symbol estimates for a desired signal based in part by using the interference covariance matrix.

BRIEF DESCRIPTION OF THE DRAWINGS

In the attached Drawing Figures:

FIG. 3A shows a first table (Table 1) for antenna port(s), scrambling identity and number of layers indication, and is Table 5.3.3.1.5C-1 from 3GPP TS 36.212 Rel-11;

FIG. 3B shows a second table (Table 2) that is a modified version of the first table to establish mapping from port index and $n_{SCID}$ to IER, where $n_{SCID}$ specifies the scrambling identity when the UE-RS Port is set to Port 7, Port 8, or Ports 7-8;

FIG. 4 shows a third table for one PDSCH transmission towards a UE, where different spatial layers or spatial layers corresponding to different transport blocks can be configured with different IERs;

FIG. 7 is a logic flow diagram performed by an eNB and a UE for interference estimation resource pattern definition and usage for enhanced receivers, and illustrates the operation of an exemplary method, a result of execution of computer program instructions embodied on a computer readable memory, and/or functions performed by logic implemented in hardware, in accordance with an exemplary embodiment;

DETAILED DESCRIPTION OF THE DRAWINGS

As explained above, in the third approach, there is actually no real issue in terms of having any DMRS or sequence limitations, but the MMSE performance relies on good channel estimation quality as such, as in the inversion of the MMSE—the same channel is present in the nominator and denominator. Therefore, channel estimation errors have a rather tremendous effect on performance deterioration of the IRC type of receiver. These issues would be removed, in case there would be specific resource elements (REs) for sample matrix inversion present that would not contain the own user's desired signal, i.e., instead there are time-frequency resources which only contain noise plus interference. This is an example of a possible implementation of the exemplary embodiments provided below. In particular, the exemplary embodiments herein describe techniques for interference estimation resource patterns and usage. Additional description of these techniques is presented after a system into which the exemplary embodiments may be used is described.

Figure 1:
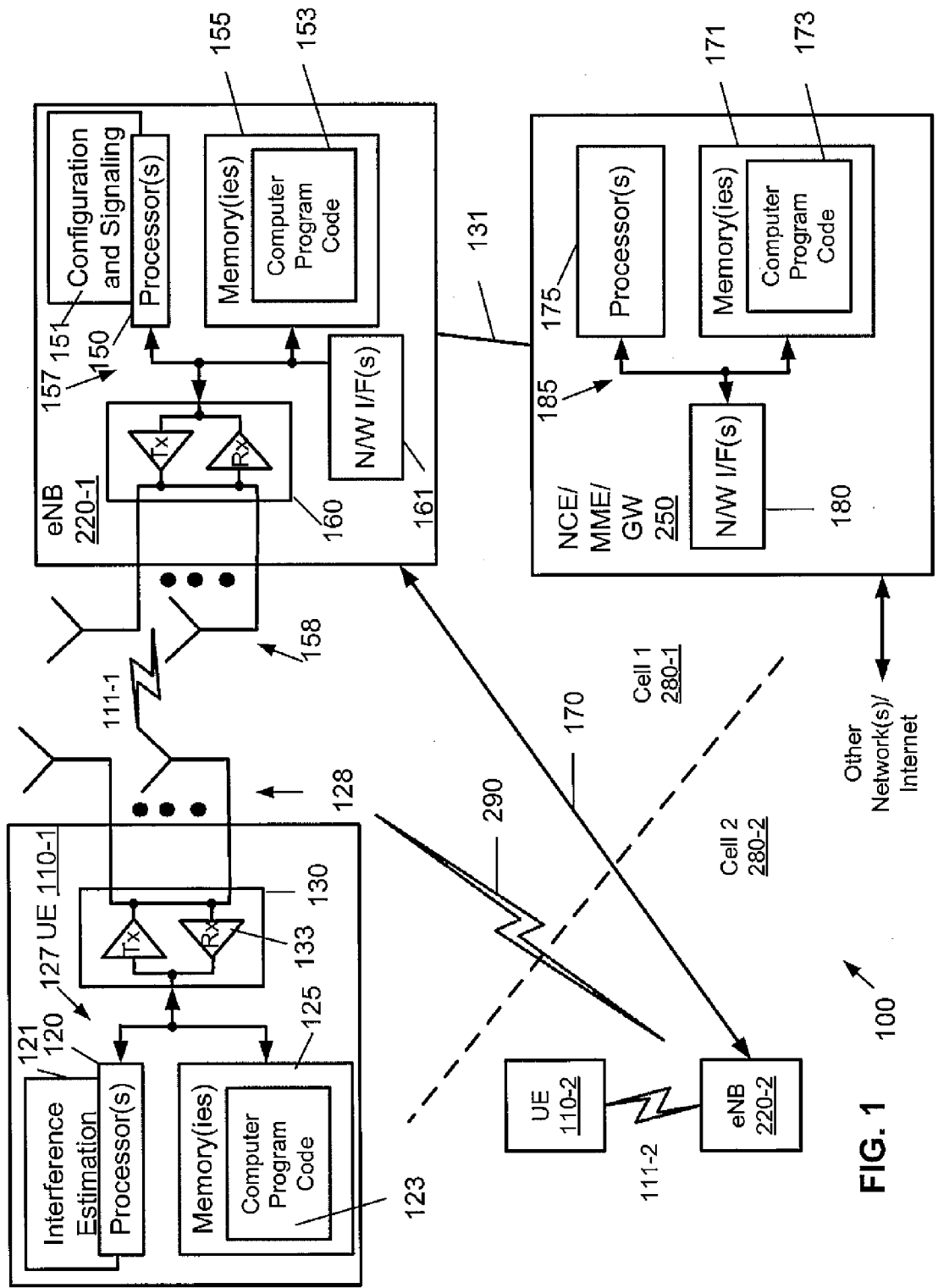
FIG. 1 is a block diagram of an exemplary system in which the exemplary embodiments may be practiced.

Turning to FIG. 1, this figure shows a block diagram of an exemplary system in which the exemplary embodiments may be practiced. In FIG. 1, a UE 110-1 and a UE 110-2 are in wireless communication with a network 100. The user equipment 110-1 includes one or more processors 120, one or more memories 125, and one or more transceivers 130 (comprising a transmitter, Tx, and a receiver, Rx) interconnected through one or more buses 127. The one or more transceivers 130 are connected to one or more antennas 128. The one or more memories 125 include computer program code 123. In an exemplary embodiment, the one or more memories 125 and the computer program code 123 are configured to, with the one or more processors 120, cause the user equipment 110 to perform one or more of the operations as described herein. The UE 110 includes an interference estimation unit 121, which may be implemented in part or completely as computer program code 123 and maybe executed by the one or more processors 120. The interference estimation unit 121 may also be formed, e.g., in part or completely, in the receiver (Rx) 133. The receiver 133 is assumed to be an enhanced receiver. The interference estimation unit 121 may be implemented in part or completely as circuitry, e.g., in the one or more processors 120 and/or the receiver 133. The UE 110-1 communicates with a first eNB 220-1 via link 111-1.

The UE 110-2 communicates with a second eNB 220-2 via a wireless link 111-2. The UE 110-2 is assumed to be similar to UE 110-1 and therefore the internals of UE 110-2 are not shown.

The eNB 220-1 includes one or more processors 150, one or more memories 155, one or more network interfaces (N/W I/F(s)) 161, and one or more transceivers 160 (comprising a transmitter, Tx, and a receiver, Rx) interconnected through one or more buses 157. The one or more transceivers 160 are connected to one or more antennas 158. The one or more memories 155 include computer program code 153. In an exemplary embodiment, the one or more memories 155 and the computer program code 153 are configured to, with the one or more processors 150, cause a corresponding one of the eNBs 220 to perform one or more of the operations as described herein. The eNB includes a configuring and signaling unit 151, which may be implemented in part or completely as computer program code 153 and may be executed by the one or more processors 150. The configuring and signaling unit 151 maybe implemented in part or completely as circuitry, e.g., in the one or more processors 150. The one or more network interfaces 161 communicate over a network such as the networks 170 and 131. A second eNB 220-1 is assumed to be similar to the eNB 220-1 and therefore the internals of eNB 220-2 are not shown. Two or more eNBs 220 communicate using, e.g., network 170. The network 170 may be wired or wireless or both and may implement, e.g., an X2 interface.

The eNB 220-1 is assumed to form a "cell" 1 280-1, while the eNB 220-2 is assumed to form a "cell" 2 280-2. A cell makes up part of an eNB. That is, there can be multiple cells per eNB. For instance, there could be three cells for a single eNB carrier frequency and associated bandwidth, each cell covering one-third of a 360 degree area so that the single eNB's coverage area covers an approximate oval or circle. Furthermore, each cell can correspond to a single carrier and an eNB may use multiple carriers. So if there are three 120 degree cells per carrier and two carriers, then the eNB has a total of 6 cells.

Interference 290 may be caused between UEs 110 and eNBs 220. For instance, interference 290 may occur for the UE 110-1 when the UE 110-2 uses the wireless link 111-2 during uplink to the eNB 220-2 or the eNB 220-2 uses the wireless link 111-2 during downlink to the UE 110-2. Similarly, interference 290 may occur for the UE 110-2 when the UE 110-1 uses the wireless link 111-1 during uplink to the eNB 220-1 or the eNB 220-1 uses the wireless link 111-1 during downlink to the UE 110-1. Mitigation of at least some of this type of interference is possible with the exemplary embodiments herein.

The wireless network 100 may include a network control element (NCE) 250 that may include MME/SGW functionality, and which provides connectivity with a further network, such as a telephone network and/or a data communications network (e.g., the Internet). The eNB 220 is coupled via a network 131 to the NCE 250. The network 131 may be implemented as, e.g., an S1 interface. The NCE 250 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 250 to perform one or more operations.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 150, and 175 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 110 can include, but are not limited to, cellular telephones such as smart phones, tablets, "phablets", personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

It is proposed herein to define NRGs (NAIC Resource Groups) to facilitate the advanced receiver 133 at the UE side. An NRG is a group of REs to help the advanced receiver 133. The UE 110 can be configured with multiple NRGs by, e.g., RRC signaling and then be instructed by downlink control to dynamically select one or several NRGs for a current PDSCH transmission, e.g., by some bits in DCI. An NRG can be also implicitly associated with a PDSCH transmission (for example, NRG 1 is associated with the first transport block in PDSCH, NRG 2 is associated with the second transport block in PDSCH, and NRG 1 and NRG 2 can be the same), so no explicit dynamic signaling for NRG may be used. Several different NRGs might be configured for a single UE receiver operation also for certain receiver types. For the example of an IC type of receiver described earlier, in the first decoding, the receiver pre-filter should still contain the interference of the other data signals specifically considered in the IC operation. That is, in case the interference x2 is to be decoded first, the estimated spatial correlation matrix of the linear prefilter should contain the interference from the intended signal x1. After the interference cancelation of interference x2 is performed, the receiver might like to employ a linear prefilter based on the interference not containing x1 or x2 when finally trying to decode x1 after successful interference cancelation of x2. In either case, an NRG could be one or both of the following types.

Figure 2:
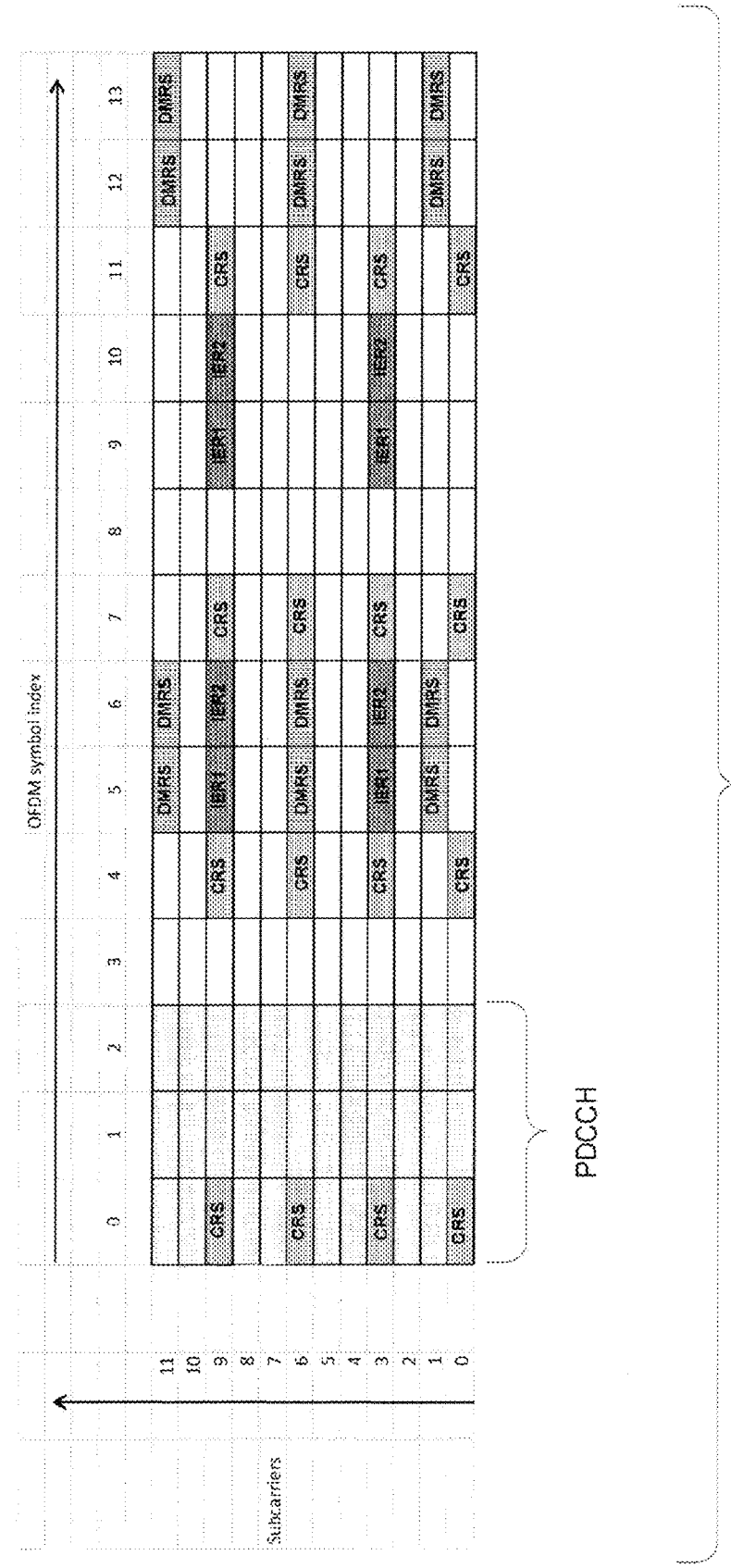
FIG. 2 illustrates a time-frequency resource space structure for DL and provides an illustration of Interference Estimation Resource (IER), where two physical resource blocks (one subframe) are shown in the time dimension and 12 subcarriers are shown in the frequency dimension.

1. Type 1: The first type is an IER (Interference Estimation Resource). Reference may be made to FIG. 2 for an illustration of IER in a time-frequency resource space for DL.

1a. An IER is defined as a group of REs that the UE 110 can use for estimating the interference covariance matrix.

1b. The UE 110 can assume that no PDSCH data for the UE is transmitted on IER REs, so all the observed signals are interference and the UE 110 can directly derive the interference covariance matrix estimation from the total received signals on these specific REs contained in the IER.

1c. The IER is UE specific and the UE 110 can only assume the IERs to be present on PRBs being part of the UE's own downlink PDSCH assignment only. The eNB 220 may also in addition configure a UE's interference accumulation granularity, for example over one PRB, 3 PRBs or wideband depending on scheduling preference that enables the UE to create an improved interference estimate by averaging the interference over several consecutive PRBs (e.g., wideband versus frequency selective scheduling, different precoding matrices for interference at PRBs).

1d. The eNB 220 can configure several IERs to one UE 110, e.g., by RRC signaling (e.g., using PDCCH or ePDCCH) and dynamically select one or several for a current PDSCH transmission. Thus, two UEs 110 that are paired up can use different IERs so each UE 110 can directly derive the interference covariance matrix including contribution from each other, see FIG. 2, and IER1 and IER2 or alternatively other cell interference than the considered pair of transmitted data channels of the two UEs. The dynamic selection can be through explicit dynamic signaling in each TTI (for example, some field in the downlink DCI format), or implicitly through the transmission rank, the antenna port(s) and the scrambling bit in TM8 or codebook state in TM9/TM10. See Table 1 of FIG. 3A for allowed combinations of transmission rank (or transmission layers), antenna port(s) and the scrambling bit ($n_{SCID}$) for DCI format 2C (TM9) and 2D (TM10). To establish the aforementioned association between IER and transmission rank, antenna port(s) and scrambling bit, with one layer transmission, 4 disjoint IERs can be associated with {port 7, $n_{SCID}$=0}, {port 8, $n_{SCID}$=1}, {port 8, $n_{SCID}$=0}, {port 8, $n_{SCID}$=1} respectively: IER 1 with {port 7, $n_{SCID}$=0}, IER 2 with {port 7, $n_{SCID}$=1}, IER 3 with {port 8, $n_{SCID}$=0}, IER 4 with {port 8, $n_{SCID}$=1}. For a higher layer transmission, the lowest port index and the $n_{SCID}$ in the combination are used to locate the corresponding IER at rank 1 and the located IER is used for the higher layer transmission. For example, with two layer transmission with {Ports 7-8, $n_{SCID}$=1}, the lowest indexed port is Port 7, and $n_{SCID}$=1. As IER 2 is used with {Port 7, $n_{SCID}$=1} at one layer transmission, then IER 2 is used for two layer transmission with (Ports 7-8, $n_{SCID}$=1). More examples can be found in Table 2 of FIG. 3B.

For one PDSCH transmission towards a UE 110, different spatial layers or spatial layers corresponding to different transport blocks can be configured with different IERs. So interference for SU-MIMO and MU-MIMO can be treated similarly. Refer to FIG. 4.

Figure 5:
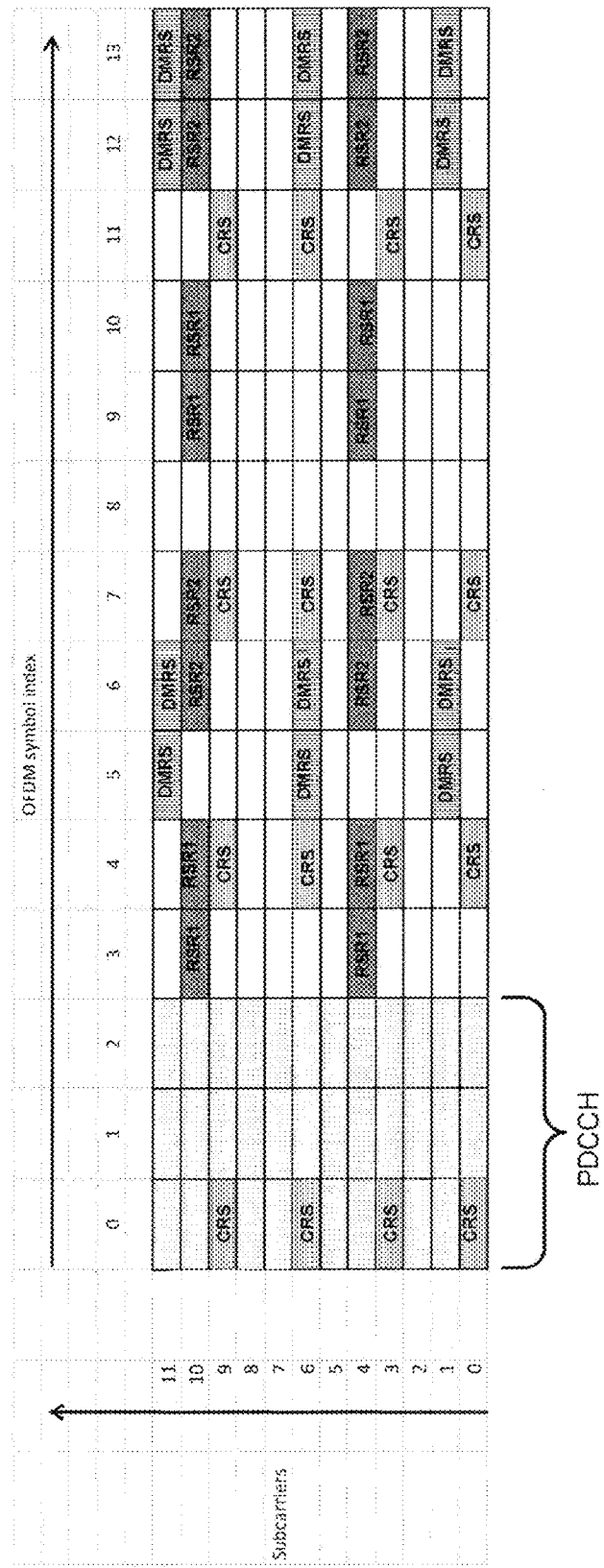
FIG. 5 illustrates a time-frequency resource space structure for DL and provides an illustration of Reference Signal Resource (RSR), where two physical resource blocks (one subframe) are shown in the time dimension and 12 subcarriers are shown in the frequency dimension.

2. Type 2: The second type is RSR (Reference Signal Resource). Reference may be made to FIG. 5 for an illustration of RSR in a time-frequency resource space for DL.

2a. RSR is defined as a group of REs to facilitate the channel estimation for UE.

2b. The UE 110 assumes its serving cell is transmitting Reference Signals (RSs) on RSR, and the UE 110 can combine the RS in RSR together with other RS to perform channel estimation. RSRs might be also used to improve the channel estimation of some interfering eNB. In that case, the serving cell is not transmitting any data on the RSR REs but the neighbor cell is transmitting the additional RSs on these REs to improve the channel estimation for the interference. This might be of especial importance for ML and IC types of receivers. Coordination of the serving cell and the neighbor cell is needed to set up the RSR configuration and signaling is also needed at the TTI level as the co-scheduled UE from another cell can change configuration (e.g., the transmission rank).

2c. The eNB 220 can configure RSR through, e.g., RRC signaling beforehand and indicate, e.g., in DCI format whether to use RSR dynamically and if the RSR is to be used to improve the channel estimation performance or the channel estimation performance of some dominant interferer for a UE. For instance, if the eNB 220 determines the decoding performance of this UE 110 is below expectation, the eNB 220 can configure additional RSRs. In the example in FIG. 5, there are four groups of RSR.

2d. Additionally, the eNB 220 can indicate which RS between CRS and DMRS the UE 110 should assume to be jointly used with RSR.

For each NRG, additionally a UE can be signaled with information concerning co-scheduled UEs, which is denoted as "Type 3" information in the following. The information can include, e.g., the DMRS of co-scheduled UEs or the RSR of a co-scheduled UE. For R-ML, modulation order and PRB allocation is signaled; for L-CWIC, the full PDSCH information such as MCS level, HARQ version, PMI, and the like is needed in addition to information concerning the DMRSs of co-scheduled UEs.

In all the examples, it is assumed Type 2 information (for RSR) can be optionally configured at a UE, so the channel estimation for the desired signal and/or the interfering signal is enhanced. In all the examples, DMRS based transmissions for the victim UE and interference are assumed unless otherwise noted.

In a first example, only Type 1 information is available at UE 110 for SU-MIMO reception using a linear MMSE-IRC type of receiver, the PDSCH signal towards a UE 110 is rank 2, and the same IER pattern (say pattern 1) is used for both ranks. The cross talk between layers for the same UE can be explicitly included in the covariance matrix estimate based on the channel estimates of the different layers in this SU-MIMO operation. When the UE calculates the receive weight for its spatial layer 1, the interference from its spatial layer 2 is added to the calculated covariance matrix from IER pattern 1, which covers the interference from other cells, co-scheduled UE(s) in the same cell (if any), and thermal noise. The receive weight for spatial layer 1 is given by $$W_{t,f,1} = (R_{in} + \hat{h}_{t,f,2} \hat{h}_{t,f,2}^H)^{-1} \hat{h}_{t,f,1},$$

where $R_{in}$ is estimated from IER pattern 1 which includes other cell interference and thermal noise, $\hat{h}_{t,f,2}$ is the channel response estimate for spatial layer 2, $\hat{h}_{t,f,1}$ is the channel response estimate for spatial layer 1, H indicates Hermitian transpose (also called conjugate transpose) and the −1 indicates matrix inverse.

In a second example, concerning Type 1 only for MU-MIMO, in the case the network does not expect the UE 110 to explicitly estimate interference from other cells, the IER patterns for different cells are disjoint. Disjoint means, e.g., none of the REs in the two IERs is the same. In a second example considering a linear MMSE-IRC type of receiver, assume the UE 1 is under cell 1, UE 2 is under cell 2, UE 1 uses IER pattern 1, and UE 2 uses IER pattern 2. The receive weight for UE 1 is given by $$W_{t,f,1} = (R_{in,1})^{-1} \hat{h}_{t,f,1},$$

where $R_{in,1}$ is estimated interference covariance matrix from IER pattern 1, which includes interference from UE 2, $\hat{h}_{t,f,1}$ is the channel response estimate for UE 1. The channel response estimate for UE 2 is not used in the formula. Depending on the interference accumulation configuration, $R_{in,1}$ is assumed to be constant over all tones (e.g., subcarriers) and OFDM symbols in one or more PRB/PRB pairs.

It is noted that $W_{t,f,1}$ does not depend on the UE receiver to explicitly obtain the channel estimate for UE 2. In this case, no Type 3 information is needed at UE 1. UE 2 in this example would utilize IER pattern 2 to estimate its interference covariance matrix, which includes the interference of cell 1 to derive its linear receiver weights in a similar manner as UE 1. As no explicit information about LTE 2 is required at UE 1, UE 1 is agnostic about the network's scheduling decision such as intracell MU-MIMO pairing or scheduling decisions at other cells. The only required coordination is the UEs need to use disjoint IERs if transmissions towards them interfere with one another; the coordination can be conducted within a cell for intracell MU-MIMO and conducted across cells for intercell transmissions. Refer to Table 2 of FIG. 3B for an example in intracell PDSCH for UE 1 has one layer and is carried over {port 7, $n_{SCID}$32 0} and IER 1 is used; PDSCH for UE 2 has one layer and is carried over {port 7, $n_{SCID}$=1} and IER 2 is used.

If Type 3 network assistance information is provided to the UE so the UE can estimate the channel response for the co-scheduled UE, then the IER patterns for different UEs can overlap each other. Overlap each other means, e.g., at least one RE is commonly included by two IERs.

In a third example, assume UE 1 is under cell 1, UE 2 is under cell 2, and both UE 1 and UE 2 use IER pattern 1. Therefore, the interference estimate based on IER pattern 1 will not include any contributions from data transmitted for UE 1 and UE 2 and thus the cross talk between UEs needs to be explicitly included in the covariance matrix estimate. UE 1 may become aware of the transmission for UE 2 through, e.g., blind detection or signaling. When the UE 1 calculates its receive weight, the interference from UE 2 is added to the calculated covariance matrix from IER pattern 1. The receive weight for UE 1 is given by $$W_{t,f,1} = (R_{in} + \hat{h}_{t,f,2}\hat{h}_{t,f,2}^H)^{-1}\hat{h}_{t,f,1},$$

where $R_{in}$ is the estimated interference covariance matrix from IER pattern 1, $\hat{h}_{t,f,2}$ is the channel response estimate for UE 2, and $\hat{h}_{t,f,1}$ is the channel response estimate for UE 1. Depending on the interference accumulation configuration, if the wireless channel changes quickly in time and/or frequency, $\hat{h}_{t,f,2}$ can take different values at tones in a PRB and/or at OFDM symbols in a subframe, and with the above formula, the receive weight $W_{t,f,1}$ can adapt to $\hat{h}_{t,f,2}$ which varies at subcarriers and OFDM symbols. As for UE 2, this UE also estimates the interference covariance matrix for IER pattern 1 and the roles for $\hat{h}_{t,f,1}$ and $\hat{h}_{t,f,2}$ are reversed.

Concerning Type 1 and Type 3 for MU-MIMO, in one case the network configures disjoint IER patterns for different cells; so every UE with Type 1 only can benefit from its IER pattern with an enhanced IRC receiver (say E-LMMSE-IRC) as in the second example. In addition, for UEs with L-CWIC receiver capability, besides Type 1, these UEs are signaled with Type 3 information, which includes enough information so decoding of the dominant interference PDSCH is feasible.

In a fourth example, assume the UE 1 is under cell 1, UE 2 is under cell 2, UE 1 uses IER pattern 1, and UE 2 uses IER pattern 2. The receiver model is given by $$r_{t,f} = h_{t,f,1}x_1 + h_{t,f,2}x_2 + \ldots + h_{t,f,M}x_M + n.$$

E-LMMSE-IRC is used by UE 1 to first decode UE 2's PDSCH. The receive weight for UE 2's PDSCH is given by $$W_{t,f,2} = (R_{in,2})^{-1}\hat{h}_{t,f,2},$$

where $R_{in,2}$ is estimated from IER pattern 2, which includes interference from UE 1, the interference from other cells and thermal noise, $\hat{h}_{t,f,2}$ is the channel response estimate for UE 2's PDSCH. Once PDSCH for UE 2 is successfully decoded, then the decoded PDSCH is remodulated and subtracted from the receiver signal:

$$\tilde{r}_{t,f} = r_{t,f} - \hat{h}_{t,f,2}x_2 = h_{t,f,1}x_1 + (h_{t,f,2} - \hat{h}_{t,f,2})x_2 + \ldots + h_{t,f,M}x_M + n.$$

Then IER pattern 1 is used on $\tilde{r}_{t,f}$ to estimate the interference covariance matrix:

$$\tilde{R}_{in,1} \approx \sum_{k=3}^{M} h_{t,f,k}h_{t,f,k}^H + \sigma_n I + (h_{t,f,2} - \hat{h}_{t,f,2})(h_{t,f,2} - \hat{h}_{t,f,2})^H,$$

And the receive weight for UE 1's PDSCH is given by $$W_{t,f,1} = (\tilde{R}_{in,1})^{-1}\hat{h}_{t,f,1}.$$

It can be seen both IER pattern for the desired PDSCH and IER pattern for interference PDSCH are useful to UE 1.

Figure 6:
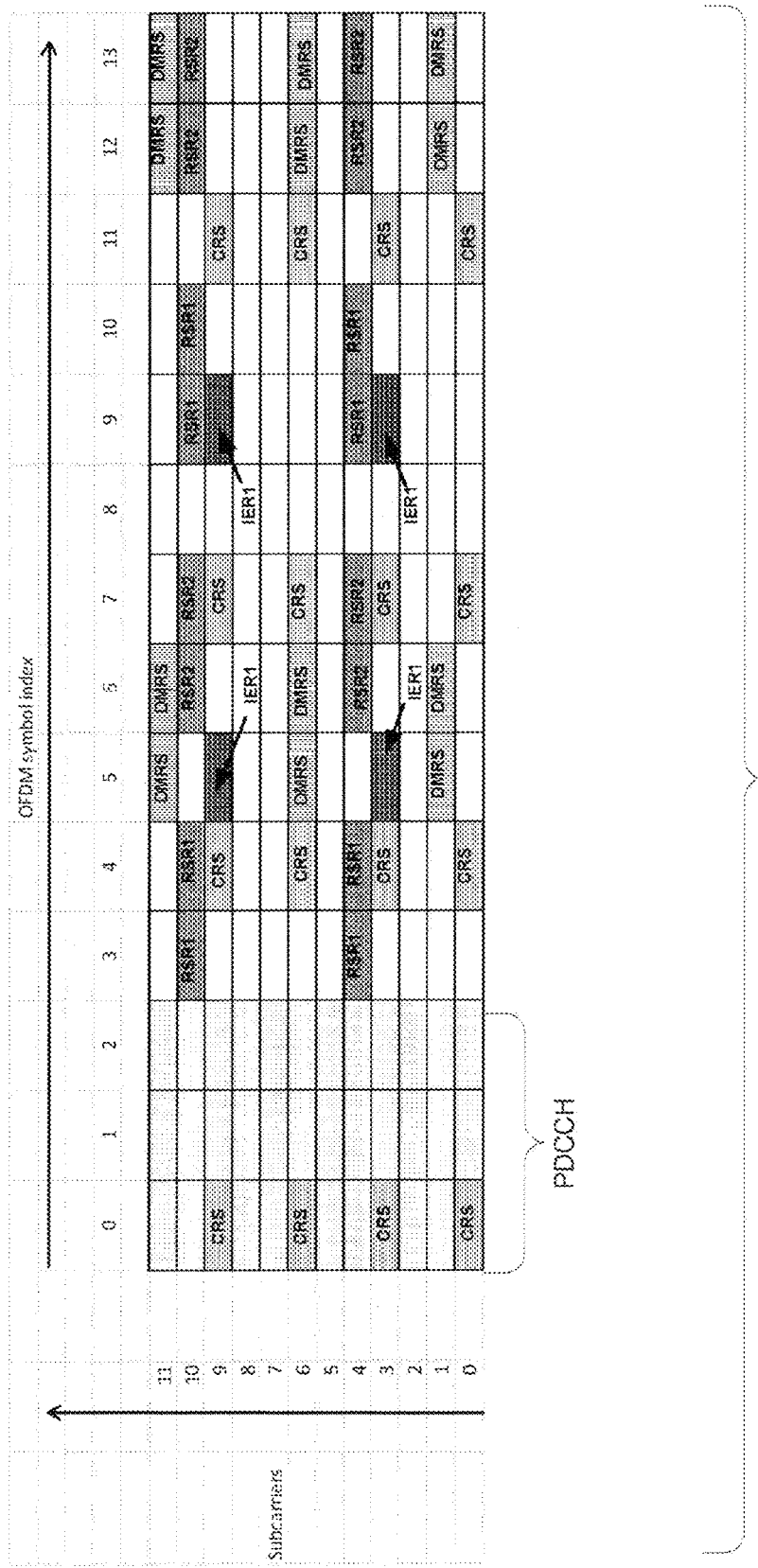
FIG. 6 illustrates a time-frequency resource space structure for DL and provides an illustration of both IER and RSR, where two physical resource blocks (one subframe) are shown in the time dimension and 12 subcarriers are shown in the frequency dimension.

Concerning Type 1, Type 2 and Type 3 for MU-MIMO, in a fifth example (with reference to FIG. 6), assume UE 1 is under cell 1, and UE 2 is under cell 2. An R-ML receiver is used at each UE. UE 1 is signaled IER 1 (for Type 1), RSR 1 with additional RS to enhance channel estimation of UE1's own data, RSR 2 with additional RS to enhance channel estimation for UE2's data (for Type 2), and Type 3 information concerning UE 2: UE 2's DMRS sequence, number of spatial layers and modulation order.

Meanwhile, UE 2 is signaled IER 1 (for Type 1), RSR 1 with additional RS to enhance channel estimation of UE1's data, RSR 2 with additional RS to enhance channel estimation of UE2's own data (for Type 2), and Type 3 information concerning UE 1: UE 1's DMRS sequence, number of spatial layers and modulation order.

Additional RS are transmitted on RSR1 by cell 1 to be used with UE 1's DMRS to achieve improved channel estimate for UE 1's PDSCH, and the corresponding REs are muted on cell 2. Additional RS are transmitted on RSR2 by cell 2, to be used with UE 2's DMRS to achieve improved channel estimate for UE 2's PDSCH, and the corresponding REs are muted on cell 1.

At UE 1, RSR 1 and UE 1's DMRS are used together to obtain improved channel estimate for UE 1's PDSCH; RSR 2 and UE 2's DMRS are used together to obtain improved channel estimate for UE 2's PDSCH. The interference covariance matrix R, calculated over IER 1 does not include the contribution from UE 2's PDSCH, and the matrix is used to whiten the received signal so the resulting signal has spatially white noise:

$$R_{in} \approx \sum_{k=3}^{M} h_{t,f,k}h_{t,f,k}^H + \sigma_n I.$$

Perform the Cholesky decomposition on $R_{in}$:

$$R_{in} = GG^H, \text{ where } G^{-1}r_{t,f} = G^{-1}h_{t,f,1}x_1 + G^{-1}h_{t,f,2}x_2 + \tilde{n}.$$

So $\tilde{n} = G^{-1}(h_{t,f,3}x_3 + \ldots + h_{t,f,M}x_M + n)$ is white. Then information on the modulation orders for $x_1$ and $x_2$ is used for further processing.

At UE 2, a similar procedure is followed. Using RSR 1 and RSR 2 can boost the channel estimation performance for both desired UE's PDSCH and interference PDSCH at both UEs.

Concerning Type 1 and Type 3 for MU-MIMO, if most UEs in the network are capable of interference cancellation such as through L-CWIC, overlapping IER patterns for different cells can be configured. Besides Type 1, some UEs are signaled with Type 3 information, which includes enough information so decoding of the dominant interference PDSCH is feasible. Some other UEs are signaled with Type 3 information which enables explicit interference estimation only.

In a sixth example, assume the UE 1 is a CRE (cell range extension) UE under cell 1 (pico), UE 2 is under cell 2 (macro), UE 1 uses IER pattern 1, and UE 2 uses IER pattern 1. Type 3 information to decode UE 2's PDSCH is signaled to UE 1, so UE 1 calculates the interference covariance matrix over IER pattern 1, and the channel response for UE 1's PDSCH is explicitly estimated and then its contribution is added to the calculated covariance matrix. And the receive weight for UE 2's PDSCH is given by $$W_{t,f,2} = (R_{in} + \hat{h}_{t,f,1}\hat{h}_{t,f,1}^H)^{-1}\hat{h}_{t,f,2}.$$

Once PDSCH for UE 2 is successfully decoded at UE 1, then we remodulate and subtract the decoded PDSCH from the receiver signal:

$$\tilde{r}_{t,f} = r_{t,f} - \hat{h}_{t,f,2}x_2 = h_{t,f,1}x_1 + (h_{t,f,2} - \hat{h}_{t,f,2})x_2 + \ldots + h_{t,f,M}x_M + n.$$

Then IER pattern 1 is used on $\tilde{r}_{t,f}$ to estimate the interference covariance matrix:

$$\tilde{R}_{in,1} \approx \sum_{k=3}^{M} h_{t,f,k}h_{t,f,k}^H + \sigma_n I + (h_{t,f,2} - \hat{h}_{t,f,2})(h_{t,f,2} - \hat{h}_{t,f,2})^H.$$

And the receive weight for UE 1's PDSCH is given by $$W_{t,f,1} = (\tilde{R}_{in,1})^{-1}\hat{h}_{t,f,1}.$$

As UE 2 does not see too much interference from the PDSCH for UE 1, UE 2 will not benefit from processing with L-CWIC, Type 3 network assistance information is provided to the UE 2 so the UE 2 can estimate the channel response for the co-scheduled UE (UE 1), and an E-LMMSE-IRC as given in example three is used.

In example seven, only Type 1 information is available at UE 110 for SU-MIMO reception, and disjoint IERs are used for different spatial layers: the PDSCH signal towards a UE 110 is rank 2, IER pattern 1 is used for spatial layer 1, 1ER pattern 2 is used for spatial layer 2. When the UE calculates the receive weight for its spatial layer 1, the interference from its spatial layer 2 is included in the calculated covariance matrix from IER, pattern 1 includes interference from spatial layer 2, the interference from other cells, co-scheduled UE(s) from the same cell (if any), and thermal noise. The receive weight for spatial layer 1 is given by $$W_{t,f,1} = (R_{in,1})^{-1}\hat{h}_{t,f,1},$$

where $R_{in,1}$ is estimated from IER pattern 1, $\hat{h}_{t,f,1}$ is the channel response estimate for spatial layer 1, $\hat{h}_{t,f,2}$, and the channel response estimate for spatial layer 2 is not used in the formula. As for spatial layer 2, the roles of $\hat{h}_{t,f,1}$ and $\hat{h}_{t,f,2}$ are reversed, the receive weight for spatial layer 2 is given by $$W_{t,f,2} = (R_{in,2})^{-1}\hat{h}_{t,f,2},$$

where $R_{in,2}$ is estimated from IER pattern 2.

It is also possible that the same IER pattern is used for all spatial layers in one transport block, but different IER patterns are used for different transport blocks.

Figure 8A:
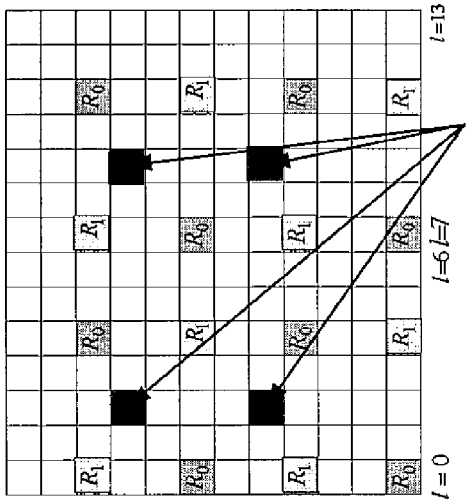
FIGS. 8A-8C are examples of a time-frequency resource space structure and illustrate REs in an IER pattern that are all located on symbol(s) where the interference CRS is present (FIG. 8A), or REs in an IER pattern that are all located on symbol(s) where the interference CRS is not present (see FIG. 8B), or REs in an IER pattern that are located on symbol (s) with interference CRS present and symbol(s) without interference CRS present (see FIG. 8C)
Figure 8B:
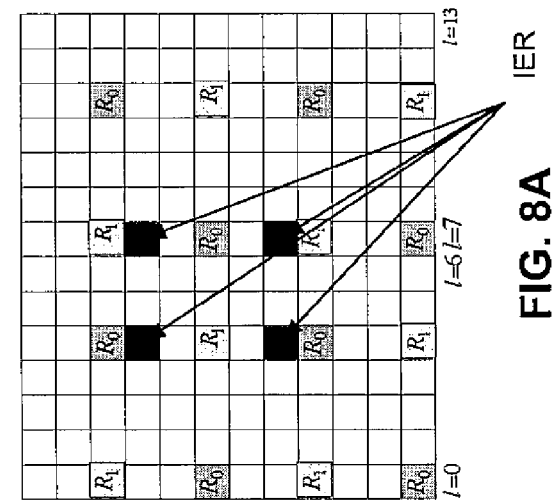
Figure 8C:
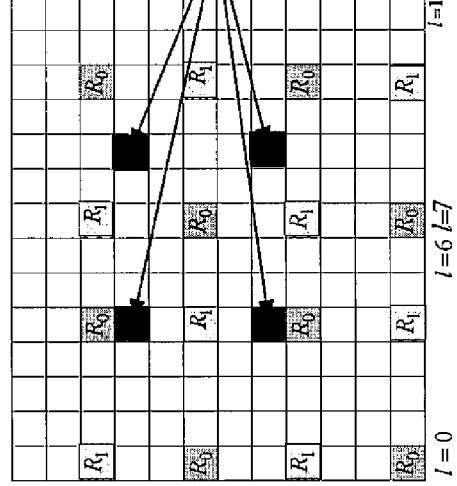

If interference is CRS based transmission, depending on whether a PDSCH RE is located on a symbol where the CRS is present, the PDSCH RE's power density can be different (e.g., controlled by $P_A/P_B$ setup of interference PDSCH; the parameters $P_A/P_B$ are described in more detail below). Depending on REs in an IER pattern are all located on symbol(s) where the interference CRS is present (see FIG. 8A), or REs in an TER pattern are all located on symbol(s) where the interference CRS is not present (see FIG. 8B), or REs in an IER pattern are located on symbol (s) with interference CRS present and symbol(s) without interference CRS present (see FIG. 8C). The thereby estimated interference needs to be scaled for the current OFDM symbol. For the same reason, if the dominant interference is CRS based transmission as in the third example, the channel estimate $\hat{h}_{t,f,2}$ also needs to be scaled to reflect accurately the dominant interference. Hence in general on one PRB, we have $$W_{t,f,1} = (C_{t,in}R_{in} + C_{t,2}\hat{h}_{t,f,2}\hat{h}_{t,f,2}^H)^{-1}\hat{h}_{t,f,1}, \ t=0, 1, 2, 3, 4, \ldots, 13, f=0, 1, 2, 3 \ldots, 11,$$

where $C_{t,in}$ is a power scaling ratio to account for different power densities at symbols with or without CRS; $C_{t,2}$ is a power scaling ratio to account for different power densities at symbols with or without CRS for UE 2. As $R_{in}$ captures interference from multiple cells and also thermal noise, even if all other cells are at CRS based transmissions for the current TTI, the $P_A/P_B$ used at each cell may be different, and consequently the UE may assume default averaged values for $P_A/P_B$ for $R_{in}$ (alternatively $C_{t,in}$), which can be signaled by the network taking into consideration of UE's feedback. For example, from the RSRP/RSRQ reports from UE, or reports from multiple CSI processes as enabled in TM 10 to measure CSI at multiple cells, the serving cell of UE 1 determines the dominant interference cells to UE 1. The most frequently used $P_A/P_B$ at the dominant interference cell, or a $P_A/P_B$ value from network coordination between the serving cell and interference cell can be used to derive the default averaged values for $P_A/P_B$ for $R_{in}$ (alternatively $C_{t,in}$).

$C_{t,2}$ reflects the power density difference at OFDM symbols with or without CRS present for UE 2's CRS based PDSCH transmission. In this case, $P_A/P_B$ for UE 2's PDSCH needs to be signaled to UE 1. Alternatively, default averaged values can be signaled to UE 1 in a semi-static fashion.

Concerning the parameters $P_A/P_B$, $P_A/P_B$ are two parameters signaled to the UE from an eNB. In section 5.2 of 3GPP TS 36.213, the procedure is given of using $P_A/P_B$ to derive $\rho_A$, the power ratio between PDSCH RE not on the same symbol as CRS and CRS RE, and $\rho^B$, the power ratio between a PDSCH RE on the same symbol as CRS and CRS RE. In TS 36.331, the signaling of PA/PB is given in PDSCH-Config.

Figure 9A:
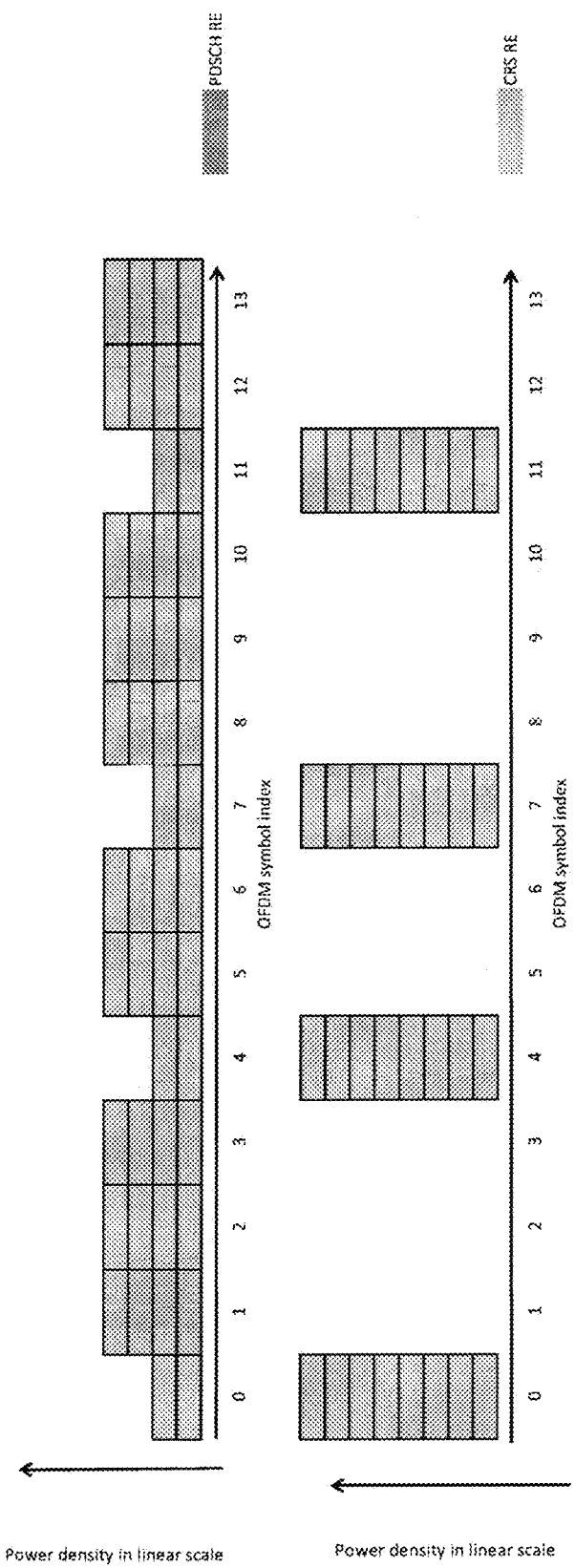
FIGS. 9A and 9B illustrate power profiles of PDSCH and CRS REs.
Figure 9B:
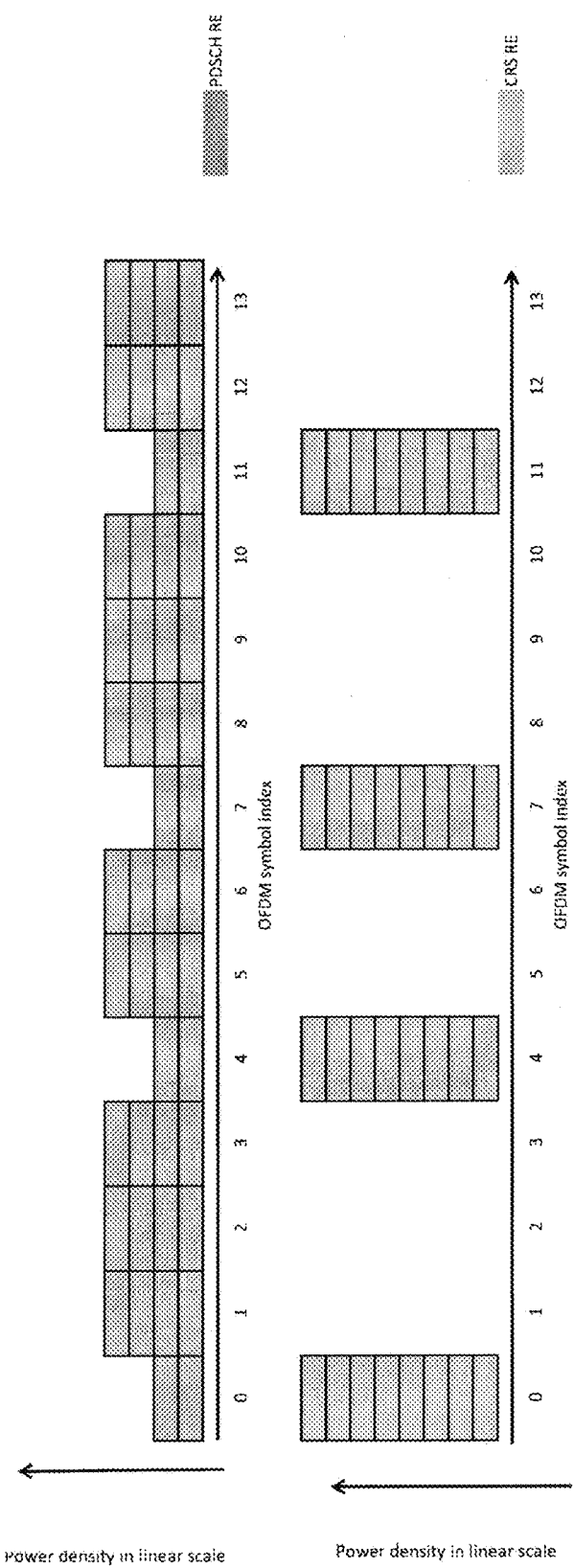

In TM4 with two Tx antennas, if the power of a CRS RE is at 0 dB, then the power of the PDSCH RE not on the same symbol as CRS can be at −6, −4.77, −3, −1.77, 0, 1, 2 or 3 dB. The power of a PDSCH RE on the same symbol as CRS can be offset with respect to the power of a PDSCH RE not on the same symbol as CRS by approximately 0, −1, −2 or −3 dB. In one example, with $P_A = -3$ dB and $P_B = 3$, $\rho_A = \frac{1}{2}$ (linear scale), $\rho_B = \frac{1}{4}$ (linear scale). We have the power profile of REs as shown in FIGS. 9A and 9B. FIGS. 9A and 9B illustrate that the power of CRS and PDSCH RS is related to the parameter of $P_A$ and $P_B$. The value of $P_A/P_B$ for interference cell needs to be known since the interference estimated from IER may be overlapped with neighbor cell's CRS. In that case, the UE needs to know the $P_A/P_B$ to calculate the real PDSCH interference. Furthermore, calculation of the real PDSCH interference depends on whether one of the following is true: 1. All the REs for IER overlap with the interferer's CRS; 2. None of the REs for IER overlaps with the interferer's CRS; or 3. The RE's for IER partially overlap with the interferer's CRS, and partially with the interferer's PDSCH. Further it can be differentiated whether the REs of IER overlapping with the interferer's PDSCH are located on an OFDM symbol with CRS or not, and the calculated interference covariance matrix should be scaled properly with the knowledge of the interferer's PA/PB so the scaled matrix is close to the real interference levels at different OFDM symbols experienced by the victim UE. For example, without scaling, 2) could underestimate the interference level substantially if the PDSCH power density is low compared to power density of the CRSs. In contrast, for DMRS based transmission modes, the power density is the same for PDSCH RE and DMRS RE for QAM16 and QAM64.

The signaling of PA/PB is given in PDSCH-Config in 3GPP TS 36.331, illustrated below.

PDSCH-Config

The IE PDSCH-ConfigCommon and the IE PDSCH-ConfigDedicated are used to specify the common and the UE specific PDSCH configuration respectively.

A portion of the PDSCH-Config information element is as follows:

```
--ASN1START
PDSCH-ConfigCommon: :=         SEQUENCE {
    referenceSignalPower         INTEGER (-60..50),
    p-b                          INTEGER (0..3)
}
PDSCH-ConfigDedicated: :=      SEQUENCE {
    p-a                          ENUMERATED {
                                   dB-6, dB-4dot77,
                                   dB-3, dB-1dot77,
                                   dB0, dB1, dB2, dB3 )
    ...
}
--ASN1STOP
```

The PDSCH-Configuration field descriptions for reference signal power are given by the following table:

| PDSCH-Config field descriptions |
| --- |
| referenceSignalPower |
| Parameter: Reference-signal power, which provides the downlink reference-signal EPRE, see TS 36.213 [23, 5.2]. The actual value in dBm. |
| p-a |
| Parameter: $P_A$, see TS 36.213 [23, 5.2]. Value dB-6 corresponds to −6 dB, dB-4dot77 corresponds to −4.77 dB etc. |
| p-b |
| Parameter: $P_B$, see TS 36.213 [23, Table 5.2-1]. |

Selected portions of section 5.2 of 3GPP TS 36.213 are copied below.

The ratio of PDS CH EPRE to cell-specific RS EPRE among PDSCH REs (not applicable to PDSCH REs with zero EPRE) for each OFDM symbol is denoted by either $\rho_A$ or $\rho_B$ according to the OFDM symbol index as given by Table 5.2-2. In addition, $\rho_A$ and $\rho_B$ are UE-specific.

The UE may assume that for 16 QAM, 64 QAM, spatial multiplexing with more than one layer or for PDSCH transmissions associated with the multi-user MIMO transmission scheme, $\rho_A$ is equal to $\delta_{power-offset}+P_A+10 \log_{10}(2)$ [dB] when the UE receives a PDSCH data transmission using precoding for transmit diversity with 4 cell-specific antenna ports according to Section 6.3.4.3 of [3];

$\rho_B$ is equal to $\delta_{power-offset}+P_A$ [dB] otherwise where $\delta_{power-off}$ is 0 dB for all PDSCH transmission schemes except multi-user MIMO and where $P_A$ is a UE specific parameter provided by higher layers.

If UE-specific RSs are present in the PRBs upon which the corresponding PDSCH is mapped, the ratio of PDSCH EPRE to UE-specific RS EPRE within each OFDM symbol containing UE-specific RSs shall be a constant, and that constant shall be maintained over all the OFDM symbols containing the UE-specific RSs in the corresponding PRBs. In addition, the UE may assume that for 16QAM or 64QAM, this ratio is 0 dB.

The cell-specific ratio $\rho_B/\rho_A$ is given by Table 5.2-1 according to cell-specific parameter $P_B$ signalled by higher layers and the number of configured eNodeB cell specific antenna ports.

Table 5.2-1, the cell-specific ratio $\rho_B/\rho_A$ for 1, 2, or 4 cell specific antenna ports, is shown below:

| | $\rho_B/\rho_A$ | |
| --- | --- | --- |
| $P_B$ | One Antenna Port | Two and Four Antenna Ports |
| 0 | 1 | 5/4 |
| 1 | 4/5 | 1 |
| 2 | 3/5 | 3/4 |
| 3 | 2/5 | 1/2 |

For PMCH with 16QAM or 64QAM, the UE may assume that the ratio of PMCH EPRE to MBSFN RS EPRE is equal to 0 dB.

Table 5.2-2, OFDM symbol indices within a slot where the ratio of the corresponding PDSCH EPRE to the cell-specific RS EPRE is denoted by $\rho_A$ or $\rho_B$, is shown below.

| | OFDM symbol indices within a slot where the ratio of the corresponding PDSCH EPRE to the cell-specific RS EPRE is denoted by $\rho_A$ | | OFDM symbol indices within a slot where the ratio of the corresponding PDSCH EPRE to the cell-specific RS EPRE is denoted by $\rho_B$ | |
| --- | --- | --- | --- | --- |
| Number of antenna ports | Normal cyclic prefix | Extended cyclic prefix | Normal cyclic prefix | Extended cyclic prefix |
| One or two | 1, 2, 3, 5, 6 | 1, 2, 4, 5 | 0, 4 | 0, 3 |
| Four | 2, 3, 5, 6 | 2, 4, 5 | 0, 1, 4 | 0, 1, 3 |

The PDSCH RE (on the same symbol as CRS) to CRS RE power ratio is shown above as $\rho_A$. The PDSCH RE (not on the same symbol as CRS) to CRS RE power ratio is shown above as $\rho_B$.

There is a trade-off between paying the price of reserving resources for IER and obtaining a better estimate for interference and noise, so the IER pattern can be configurable depending on SINR operation, the number of DMRS ports, and the interference, so the density of IER can be configurable for UEs, and changes dynamically according to the currently scheduled PDSCH.

Rate matching or puncturing can be used around IER in a PDSCH at the UE of interest. Consider the case given in the fifth example, if UE 2's PDSCH is at a legacy transmission mode (e.g., TM9 or TM10), UE 2 cannot perform rate matching around MR 1. Instead, puncturing has to be used. If UE 2's PDSCH is at a new transmission mode or a modified legacy transmission mode (e.g., TM10 modified with a capability to perform rate matching around IER), then rate matching can be used. For UE 1 to correctly decode UE 2's PDSCH, then necessary signaling is needed to indicate whether rate matching or puncturing is used for UE 2's PDSCH. Alternatively puncturing over REs taken by IERs can be always assumed so no signaling is needed to indicate that.

The IER pattern can be generated in many ways: Reed-Solomon codes, Costa array, 1D (one dimension) bit reverse sequence mapped to a 2D (two dimension) array, and the like. And the IER pattern's generation can be controlled by cell ID, virtual cell ID, UE ID, the number of transmission layers, the port indices, scrambling ID ($n_{SCID}$ in DCI formats 2C and 2D), and the like. Part of signaling design for CSI-RS (zero power CSI-RS, IMR, and the like) may be reused as well but as mentioned earlier IER would be needed in the sub frame when the decoding is to be performed (i.e., a 5 ms periodicity as for CSI-RS is not sufficient).

Turning to FIG. 7, this figure is a logic flow diagram performed by an eNB and a UE for interference estimation resource pattern for enhanced receivers. This figure illustrates the operation of an exemplary method, a result of execution of computer program instructions embodied on a computer readable memory, and/or functions performed by logic implemented in hardware, in accordance with an exemplary embodiment. The blocks and portions in the blocks may be considered to be interconnected means for performing the functions in the blocks and portions thereof. The eNB 220 is assumed to perform, e.g., under control of the configuring and signaling unit 151, the operations that are stated as being performed by the eNB. The UE 110 is assumed to perform, e.g., under control of the interference estimation unit 121, the operations that are stated as being performed by the UE.

The operations in 1.1-1.3 concern information from the UE that may be used by the eNB in order for the eNB to decide whether the UE is a candidate for MU-MIMO. In 1.1, the UE 110 reports its receiver capability (e.g., E-LMMSE-IRC or L-CWIC, R-ML). In 1.2, the UE 110 feeds back RSRP/RSRQ measurements to the eNB 220. In 1.3, the UE 110 can feed back CSI reports with multiple CSI processes that are configured for serving and interfering cells.

For 2.1 (including 2.1.1 and 2.1.2), the intention is for the eNB 220 to semi-statically configure NRGs at the UE 110, and at each TTI, the appropriate NRG is selected through downlink control. Semi-static configuration, as is known, is a concept where the configuration stays the same over some (e.g., relatively large) time period. In 2.1, the eNB 220 configures a UE 110 with one or more interference estimation resources (IER). In 2.1.1, optionally a power scaling ratio (e.g., $P_A/P_B$) can be signaled with each configured IER. If a power scaling ratio if not signaled, the power scaling ratio is assumed to be 1 (one). In 2.1.2, the eNB 220 configures a UE 110 with one or more Reference Signal Resources (RSR) associated with the desired UE's and/or co-scheduled UE's transmission(s).

In 3.1, the eNB 220 transmits to the UE 110 with chosen MCS level, transmission rank, precoding matrix for the scheduled UE. In 3.2, from UE's receiver capability and assessment on the UE's chance to benefit from interference suppression and interference cancellation, the eNB 220 signals one or more IER and zero or more RSR to the UE.

The eNB 220 can signal to the UE 110 with zero or more demodulation reference signals of co-scheduled UE(s) and the number of ports for each demodulation reference signal.

In 3.2.1, power scaling ratio can be signaled with each configured co-scheduled UE's demodulation signal. If a power scaling ratio is not signaled, the power scaling ratio is assumed to be 1 (one). For 3.2.2 and 3.2.3, for more advanced receivers, additional information can be signaled to the UE to provide additional information to the UE to be used for interference cancellation. For instance, in 3.2.2, the modulation order(s) of the co-scheduled UE(s) can be signaled to the LTEs with R-ML capability. As another example, in 3.2.3, PRB allocation, MCS level, HARQ version, and scrambling seed for the co-scheduled UE(s) can be signaled to the UE with L-CWIC capability and which can benefit from interference cancellation according to the eNB.

The operations 4.1-4.4 are performed by the UE 110. In 4.1, an interference covariance matrix is estimated from a signaled MR. In 4.2, demodulation reference signal(s) and RSRs if available are used to obtain channel estimates for the desired signal and interference. In block 4.3, the contribution from interference is found from the channel estimate for interference and the calculated interference covariance matrix is weighed with power scaling ratios to obtain a weighted interference covariance matrix. In block 4.4, a receive weight is found from the weighted interference covariance matrix and channel estimate for the desired signal. As described above, the receive weight is used to find the symbol estimates for the desired signal.

It is noted that emphasis above is placed on downlink, but the same design could be applied for uplink and D2D type implementations as well. D2D involves data transmission from a UE to another UE. The same principle can be applied here (in D2D) although there is no difference between uplink and downlink in D2D. Furthermore, in current LTE, the UE is transmitting DMRS in uplink. Meanwhile in an exemplary embodiment herein, an eNB could configure a UE to transmit RSR along with DMRS in uplink to enhance the channel estimation.

IMR was described above. In Rel-11, IMR (Interference measurement Resource) is defined to facilitate the interference measurement for CQI calculation. IMR REs can be used for interference covariance matrix estimation. However IMR has some drawbacks:

In a real network, the interference is quite dynamic. The interference can be seen from a bursty traffic model, where interference changes from TTI to TTI, e.g., in the bursty traffic model, with 50%~80% utilization setup.

a. IMR duty cycle is at least 5 ms, which is not helpful for interference covariance matrix estimation since interference changes quickly. Meanwhile, IER is sent with an assigned PDSCH transmission, hence IER is typically a "one shot" transmission, and there is no period associated with IER. Further, IMR is semi-statically configured for a UE to measure, and IMR is irrelevant to the PDSCH. By contrast, IER is tightly associated with the assigned PDSCH. The UE can assume that the interference observed on IER is preciously the same as that on PDSCH REs.

b. Each IMR is of 4 REs, but interference covariance matrix estimation may require a different number of REs. Therefore, the number of REs for IER may be configurable.

c. IMR takes REs from Rel-10 CSI RS, which can have a severe cell planning issue. By contrast, IER can take different REs in an irregular way to ease cell planning issues.

d. IMR takes the whole band, whereas IER takes the PRBs for PDSCH assignment only.

e. For IMR usage, no specific measurement is provided. However, specific processing steps should be laid out for IER:

The eNB can also configure a UE's interference accumulation granularity, for example, over one PRE, 3 PRBs or wideband, depending on scheduling preference (e.g., wideband versus FSS scheduling).

2) The eNB can configure several IER to one UE by RRC signaling and dynamically select one for a current assigned PDSCH transmission. Thus, two UEs paired up can always use different IER so each UE can always directly derive another's interference covariance matrix.

Regarding RSR, the most similar design to RSR is DMRS, but RSR has differences from DMRS. Exemplary differences are as follows.

a. An eNB can configure RSR through RRC signaling beforehand and indicate in DCI format whether to use RSR dynamically. For instance, if an eNB determines the decoding performance of this UE is below expectation, the eNB can configure additional RSR. See FIG. 2 for instance.

b. Additionally, the eNB can indicate which RS the UE should assume to be jointly used with RSR.

Figure 10:
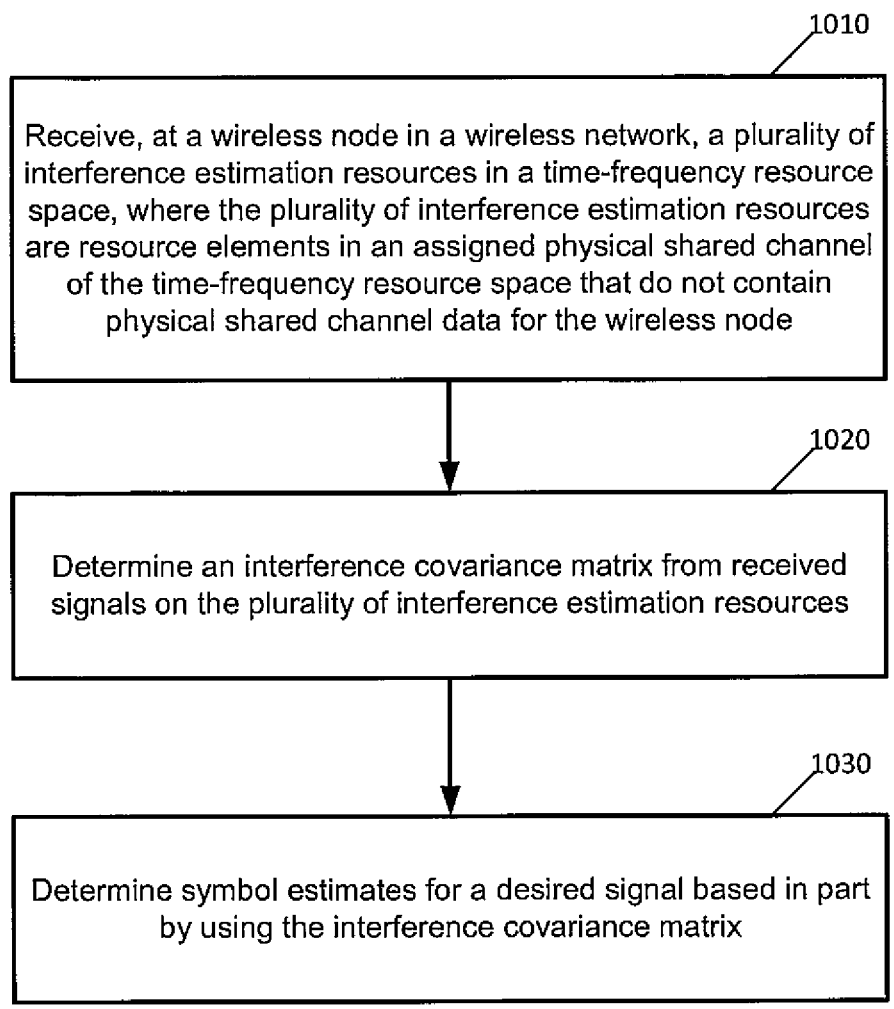
FIG. 10 is a logic flow diagram performed by an eNB or a UE for interference estimation resource pattern definition and usage for enhanced receivers, and illustrates the operation of an exemplary method, a result of execution of computer program instructions embodied on a computer readable memory, and/or functions performed by logic implemented in hardware, in accordance with an exemplary embodiment.

Exemplary items described below are examples of the exemplary techniques provided above. These items are illustrated in part using FIG. 10. FIG. 10 is a logic flow diagram performed by an eNB or a UE for interference estimation resource pattern definition and usage for enhanced receivers, and illustrates the operation of an exemplary method, a result of execution of computer program instructions embodied on a computer readable memory, and/or functions performed by logic implemented in hardware, in accordance with an exemplary embodiment. Item 1 corresponds to FIG. 10, and additional items are dependent on Item 1 and FIG. 10. Item 1. A method, comprising: receiving, at a wireless node in a wireless network, a plurality of interference estimation resources in a time-frequency resource space, where the plurality of interference estimation resources are resource elements in an assigned physical shared channel of the time-frequency resource space that do not contain physical shared channel data for the wireless node (block 1010); determining an interference covariance matrix from received signals on the plurality of interference estimation resources (block 1020); and determining symbol estimates for a desired signal based in part by using the interference covariance matrix (block 1030).

Item 2. The method of item 1, wherein determining symbol estimates further comprises determining a receive weight based in part by using the interference covariance matrix and using the receive weight to determine the symbol estimates.

Item 3. The method of any one of items 1 or 2, wherein the method is performed in a cell, the cell has at least one neighbor cell, and interference estimation resources patterns for different cells are disjoint.

Item 4. The method of any one of items 1 or 2, wherein the method is performed in a cell, the cell has at least one neighbor cell, and interference estimation resources patterns for different cells overlap each other.

Item 5. The method of any one of items 1 or 2, wherein for one physical shared channel reception, different spatial layers or spatial layers corresponding to different transport blocks are configured with different interference estimation resources.

Item 6. The method of any one of items 1 or 2, wherein the wireless node comprises a user equipment that is a first user equipment, there is a second user equipment, and interference estimation resources patterns for these different user equipment are disjoint.

Item 7. The method of any one of items 1 or 2, wherein the wireless node comprises a user equipment that is a first user equipment, there is a second user equipment, and interference estimation resources patterns for these different user equipment overlap each other.

Item 8. The method of any one of items 1 to 7, wherein: the wireless node is a user equipment and the physical shared channel is a physical downlink shared channel.

Item 9. The method of any one of items 1 to 7, wherein: the wireless node is a base station and the physical shared channel is a physical uplink shared channel.

Item 10. The method of any one of items 1 to 7, wherein: the wireless node is a user equipment and the physical shared channel is a channel used to communicate in a device-to-device communication with another user equipment.

Item 11. The method of any one of items 2 to 7, wherein: the wireless node is a user equipment; the method further comprises receiving one or more reference signal resources, each reference signal resource occupying a resource element in a physical downlink shared channel of the time-frequency resource space and comprising a reference signal transmitted by a cell serving the user equipment, where the reference signal is to be used by the user equipment to enhance a channel estimate for a channel for the cell serving the user equipment; the method further comprises obtaining one or more channel estimates for the channel for the cell serving the user equipment by using at least the one or more reference signals in the one or more reference signal resources; and determining the receive weight further comprises determining the receive weight by using at least the one or more channel estimates and the interference covariance matrix.

Item 12. The method of any of items 2 to 7 or 11, wherein: the wireless node is a user equipment; the method further comprises receiving one or more second reference signal resources, each second reference signal resource occupying a resource element in a physical downlink shared channel of the time-frequency resource space and comprising a second reference signal transmitted by a cell that is a neighbor to the cell serving the user equipment, where the second reference signal is to be used by the user equipment to enhance a channel estimate of interference from at least the neighbor cell; the method further comprises obtaining one or more second channel estimates for at least the neighbor cell by using at least the one or more second reference signal resources; and determining the receive weight further comprises determining the receive weight by using at least the one or more second channel estimates and the interference covariance matrix.

Item 13. The method of item 12, wherein the interference from at least the neighbor cell is caused at least by a second user equipment in the neighbor cell.

Item 14. The method of any one of items 2 to 7, wherein: the wireless node is a user equipment; the method further comprises receiving one or more reference signal resources, each reference signal resource occupying a resource element in a physical downlink shared channel of the time-frequency resource space and comprising the reference signal is to be used by the user equipment to enhance a channel estimate for a second user equipment; the method further comprises obtaining one or more channel estimates for the second user equipment by using at least the one or more reference signal resources; and determining the receive weight further comprises determining the receive weight by using at least the one or more channel estimates and the interference covariance matrix.

Item 15. The method of any one of items 1 to 14, wherein signaling of using interference estimation resources is part of downlink control information through a physical downlink control channel or an enhanced physical downlink control channel.

Item 16. The method of any one of items 2 to 5, wherein: the wireless node is a base station; the method further comprises receiving one or more reference signal resources, each reference signal resource occupying a resource element in a physical uplink shared channel of the time-frequency resource space and comprising a reference signal transmitted by a user equipment served by a cell formed by the base station, where the reference signal is to be used by the base station to enhance a channel estimate for a channel for the user equipment; the method further comprises obtaining one or more channel estimates for the channel for the user equipment by using at least the one or more reference signals in the one or more reference signal resources; and determining the receive weight further comprises determining the receive weight by using at least the one or more channel estimates and the interference covariance matrix.

Item 17. The method of any one of items 2 to 5 or 16, wherein: the wireless node is a base station; the method further comprises receiving one or more second reference signal resources, each second reference signal resource occupying a resource element in a physical uplink shared channel of the time-frequency resource space and comprising a second reference signal transmitted from a cell that is a neighbor to a formed by the base station, where the second reference signal is to be used by the base station to enhance a channel estimate of interference from at least the neighbor cell; the method further comprises obtaining one or more second channel estimates for at least the neighbor cell by using at least the one or more second reference signal resources; and determining the receive weight further comprises determining the receive weight by using at least the one or more second channel estimates and the interference covariance matrix.

Item 18. The method of item 17, wherein the interference from at least the neighbor cell is caused at least by a second user equipment in the neighbor cell.

Item 19. The method of any one of items 2 to 5, wherein: the wireless node is a base station; the method further comprises receiving one or more first reference signal resources and one or more second reference signal resources, each reference signal resource occupying a resource element in a physical uplink shared channel of the time-frequency resource space and comprising a reference signal transmitted by a corresponding one of first or second user equipment served by the base station, where a first reference signal is to be used by the base station to enhance a channel estimate for a first user equipment and a second reference signal is to be used by the base station to enhance a channel estimate for a second user equipment; the method further comprises obtaining one or more channel estimates for the first and the second user equipment by using at least the one or more first and second reference signal resources; and determining the receive weight further comprises determining the receive weight by using at least the one or more first and second channel estimates and the interference covariance matrix.

Item 20. An additional exemplary embodiment includes a computer program, comprising code for performing any of the above methods; when the computer program is run on a processor. The computer program according to this paragraph, wherein the computer program is a computer program product comprising a computer-readable medium bearing computer program code embodied therein for use with a computer.

Item 21. An exemplary computer program product includes a computer-readable storage medium bearing computer program code embodied therein for use with a computer. The computer program code includes code for performing any of the above methods.

Item 22. Another exemplary embodiment is an apparatus that comprises means for performing any of the above methods. A user equipment comprises means for performing any of the methods of items 1 to 8 or 10 to 15. A base station comprises means for performing any of the methods of items 1 to 5, 9, or 16 to 19. A system comprises means for performing any of the methods of items 1 to 8 or 10 to 15 or means for performing any of the methods of items 1 to 5, 9, or 16 to 19.

Without in any way limiting the scope, interpretation, or application of the claims appearing below, a technical effect of one or more of the example embodiments disclosed herein is decoding of the dominant interference PDSCH is feasible. Another technical effect of one or more of the example embodiments disclosed herein is facilitation of an advanced receiver. Another technical effect of one or more of the example embodiments disclosed herein is the ability to directly derive an interference covariance matrix estimation from the total received signals on specific REs contained in an IER. A further technical effect of one or more of the exemplary embodiments herein is an improvement in interference estimation.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that does not encompass propagating signals but may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP third generation partnership project
CQI Channel Quality Indicator
CRS Cell-specific Reference Signal
CSI-RS Channel State Information-Reference Signal
CWIC Codeword Level Interference Cancellation
D2D Device to Device
DCI Downlink Control Information
DL Downlink (from base station to UE)
DMRS DeModulation Reference Signal
E-LMMSE-IRC Enhanced LMMSE-IRC
ePDCCH enhanced PDCCH
eNB evolved Node B (LTE base station)
FSS Frequency Selective Scheduling
IC Interference Cancellation
ID IDentification
ER Interference Estimation Resource
IMR Interference Measurement Resource
IRC Interference Rejection Combining
eNB Enhanced Node B (LTE base station)
L-CWIC Linear-CWIC
LMIVI SE Linear Minimum Mean Square Error
LTE Long Term Evolution
MCS Modulation and Coding Scheme
MIMO Multiple-Input Multiple Output
ML Maximum Likelihood
MME Mobility Management Entity
MMSE Minimum Mean Square Error
MU-MIMO Multiple User MIMO
ms milliseconds
NAIC Network Assisted Interference Cancellation
NCE Network Control Element
NRG (NAIC Resource Group)
OFDM Orthogonal Frequency Division Multiplex
PDCCH Physical Downlink Control CHannel
PDSCH Physical Downlink Shared CHannel
PMI Precoding Matrix Indictor
PRB Physical Resource Block
QAM Quadrature Amplitude Modulation
RE Resource Element
Rel Release
R-ML Reduced Complexity-ML
RRC Radio Resource Control
RS Reference Signal
RSR Reference Signal Resource
RSRP Reference Signal Received Power
RSRQ Reference Signal Received Quality
Rx Receiver or reception
SCID Scrambling ID
SGW Serving GateWay
SINR Signal-to-Interference-plus-Noise Ratio
SLIC Symbol Level IC
SU-MIMO Single User MIMO
TM Transmission Mode
TTI Transmission Time Interval
Tx Transmitter
UE User Equipment
UL Uplink (from UE to base station)

What is claimed is:

1. A method, comprising:
receiving, at a wireless node in a wireless network, configuration of a plurality of interference estimation resources in a time-frequency resource space, where the plurality of interference estimation resources are resource elements in an assigned physical shared channel of the time-frequency resource space that do not contain physical shared channel data for the wireless node;
determining an interference covariance matrix from received signals on the plurality of interference estimation resources; and
determining symbol estimates for a desired signal based in part by using the interference covariance matrix.

2. The method of claim 1, wherein determining symbol estimates further comprises determining a receive weight based in part by using the interference covariance matrix and using the receive weight to determine the symbol estimates.

3. The method of claim 1, wherein the method is performed in a cell, the cell has at least one neighbor cell, and interference estimation resources patterns for different cells are disjoint.

4. The method of claim 1, wherein the method is performed in a cell, the cell has at least one neighbor cell, and interference estimation resources patterns for different cells overlap each other.

5. The method of claim 1, wherein for one physical shared channel reception, different spatial layers or spatial layers corresponding to different transport blocks are configured with different interference estimation resources.

6. The method of claim 1, wherein the wireless node comprises a user equipment that is a first user equipment, there is a second user equipment, and interference estimation resources patterns for these different user equipment are disjoint.

7. The method of claim 1, wherein the wireless node comprises a user equipment that is a first user equipment, there is a second user equipment, and interference estimation resources patterns for these different user equipment overlap each other.

8. The method of claim 1, wherein: the wireless node is a user equipment and the physical shared channel is a physical downlink shared channel.

9. The method of claim 1, wherein: the wireless node is a base station and the physical shared channel is a physical uplink shared channel.

10. The method of claim 1, wherein: the wireless node is a user equipment and the physical shared channel is a channel used to communicate in a device-to-device communication with another user equipment.

11. The method of claim 2, wherein:
the wireless node is a user equipment;
the method further comprises receiving configuration of one or more reference signal resources, each reference signal resource occupying a resource element in a physical downlink shared channel of the time-frequency resource space and comprising a reference signal transmitted by a cell serving the user equipment, where the reference signal is to be used by the user equipment to enhance a channel estimate for a channel for the cell serving the user equipment;
the method further comprises obtaining one or more channel estimates for the channel for the cell serving the user equipment by using at least the one or more reference signals in the one or more reference signal resources; and
determining the receive weight further comprises determining the receive weight by using at least the one or more channel estimates and the interference covariance matrix.

12. The method of claim 11, wherein:
the wireless node is a user equipment;
the method further comprises receiving configuration of one or more second reference signal resources, each second reference signal resource occupying a resource element in a physical downlink shared channel of the time-frequency resource space and comprising a second reference signal transmitted by a cell that is a neighbor to the cell serving the user equipment, where the second reference signal is to be used by the user equipment to enhance a channel estimate of interference from at least the neighbor cell;
the method further comprises obtaining one or more second channel estimates for at least the neighbor cell by using at least the one or more second reference signal resources; and
determining the receive weight further comprises determining the receive weight by using at least the one or more second channel estimates and the interference covariance matrix.

13. The method of claim 12, wherein the interference from at least the neighbor cell is caused at least by a second user equipment in the neighbor cell.

14. The method of claim 2, wherein:
the wireless node is a user equipment;
the method further comprises receiving configuration of one or more reference signal resources, each reference signal resource occupying a resource element in a physical downlink shared channel of the time-frequency resource space and comprising the reference signal is to be used by the user equipment to enhance a channel estimate for a second user equipment;
the method further comprises obtaining one or more channel estimates for the second user equipment by using at least the one or more reference signal resources; and
determining the receive weight further comprises determining the receive weight by using at least the one or more channel estimates and the interference covariance matrix.

15. The method of claim 1, wherein signaling of using interference estimation resources is part of downlink control information through a physical downlink control channel or an enhanced physical downlink control channel.

16. The method of claim 2, wherein:
the wireless node is a base station;
the method further comprises receiving configuration of one or more reference signal resources, each reference signal resource occupying a resource element in a physical uplink shared channel of the time-frequency resource space and comprising a reference signal transmitted by a user equipment served by a cell formed by the base station, where the reference signal is to be used by the base station to enhance a channel estimate for a channel for the user equipment;
the method further comprises obtaining one or more channel estimates for the channel for the user equipment by using at least the one or more reference signals in the one or more reference signal resources; and
determining the receive weight further comprises determining the receive weight by using at least the one or more channel estimates and the interference covariance matrix.

17. The method of claim 16, wherein:
the wireless node is a base station;
the method further comprises receiving configuration of one or more second reference signal resources, each second reference signal resource occupying a resource element in a physical uplink shared channel of the time-frequency resource space and comprising a second reference signal transmitted from a cell that is a neighbor to a formed by the base station, where the second reference signal is to be used by the base station to enhance a channel estimate of interference from at least the neighbor cell;
the method further comprises obtaining one or more second channel estimates for at least the neighbor cell by using at least the one or more second reference signal resources; and
determining the receive weight further comprises determining the receive weight by using at least the one or more second channel estimates and the interference covariance matrix.

18. The method of claim 17, wherein the interference from at least the neighbor cell is caused at least by a second user equipment in the neighbor cell.

19. The method of claim 2, wherein:
the wireless node is a base station;
the method further comprises receiving configuration of one or more first reference signal resources and one or more second reference signal resources, each reference signal resource occupying a resource element in a physical uplink shared channel of the time-frequency resource space and comprising a reference signal transmitted by a corresponding one of first or second user equipment served by the base station, where a first reference signal is to be used by the base station to enhance a channel estimate for a first user equipment and a second reference signal is to be used by the base station to enhance a channel estimate for a second user equipment;
the method further comprises obtaining one or more channel estimates for the first and the second user equipment by using at least the one or more first and second reference signal resources; and
determining the receive weight further comprises determining the receive weight by using at least the one or more first and second channel estimates and the interference covariance matrix.

20. An apparatus, comprising:
one or more processors; and
one or more memories including computer program code,
the one or more memories and the computer program code configured, with the one or more processors, to cause the apparatus to perform at least the following:
receiving, at a wireless node in a wireless network, configuration of a plurality of interference estimation resources in a time-frequency resource space, where the plurality of interference estimation resources are resource elements in an assigned physical shared channel of the time-frequency resource space that do riot contain physical shared channel data for the wireless node;
determining an interference covariance matrix from received signals on the plurality of interference estimation resources; and
determining symbol estimates for a desired signal based in part by using the interference covariance matrix.

21. A computer program product comprising a non-transitory computer-readable storage medium bearing computer program code embodied therein for use with a computer, wherein execution of the computer program code by the computer causes the computer to perform:

receiving, at a wireless node in a wireless network, configuration of a plurality of interference estimation resources in a time-frequency resource space, where the plurality of interference estimation resources are resource elements in an assigned physical shared channel of the time-frequency resource space that do not contain physical shared channel data for the wireless node;

determining an interference covariance matrix from received signals on the plurality of interference estimation resources; and determining symbol estimates for a desired signal based in part by using the interference covariance matrix.

* * * * *

UNITED STATES PATENT AND TRADEMARK OFFICE
CERTIFICATE OF CORRECTION

PATENT NO. : 9,509,426 B2
APPLICATION NO. : 14/508401
DATED : November 29, 2016
INVENTOR(S) : Weidong Yang et al.

It is certified that error appears in the above-identified patent and that said Letters Patent is hereby corrected as shown below:

In Claim 20:

Column 26, Line 55, "riot" should be deleted and --not-- should be inserted.

Signed and Sealed this
Twenty-fourth Day of January, 2017

Michelle K. Lee
*Director of the United States Patent and Trademark Office*